(12) United States Patent
Stones

(10) Patent No.: US 7,407,015 B2
(45) Date of Patent: Aug. 5, 2008

(54) SAFETY MECHANISM FOR POWER TOOL AND POWER TOOL INCORPORATING SUCH MECHANISM

(75) Inventor: Kevin Stones, Bishop Auckland (GB)

(73) Assignee: Black & Decker Inc., Newark, DE (US)

( * ) Notice: Subject to any disclaimer, the term of this patent is extended or adjusted under 35 U.S.C. 154(b) by 8 days.

(21) Appl. No.: 10/914,493

(22) Filed: Aug. 9, 2004

(65) Prior Publication Data

US 2005/0284647 A1 Dec. 29, 2005

(30) Foreign Application Priority Data

Aug. 9, 2003 (GB) ................... 0318751.5

(51) Int. Cl.
B26B 15/00 (2006.01)
(52) U.S. Cl. .................. 173/170; 173/171; 30/208; 30/210; 30/216
(58) Field of Classification Search ............... 173/170, 173/171, 217; 200/43.17, 334, 522, 43.11, 200/43.12, 43.13, 43.14, 43.15, 51 LM, 552, 200/318, 321, 322, 332.1, 332.2, 329, 43.16; 30/216, 208, 210, 312, 514, 517, 520, 252
See application file for complete search history.

(56) References Cited

U.S. PATENT DOCUMENTS

| | | | |
|---|---|---|---|
| 3,902,243 A | | 9/1975 | Klebe, Jr. |
| 4,122,320 A | * | 10/1978 | Edgell et al. ............. 200/43.17 |
| 4,206,657 A | | 6/1980 | Palm |
| 4,782,593 A | * | 11/1988 | Kieser et al. ................... 30/382 |
| 4,879,438 A | | 11/1989 | Winchester |
| 5,145,044 A | * | 9/1992 | Kramer et al. .......... 192/131 R |
| 5,150,523 A | | 9/1992 | McCurry |
| 5,369,236 A | * | 11/1994 | Nickels, Jr. ................. 200/329 |
| 5,638,945 A | | 6/1997 | Fukinuki et al. |

(Continued)

FOREIGN PATENT DOCUMENTS

DE 1 947 014 3/1971

(Continued)

*Primary Examiner*—Rinaldi Rada
*Assistant Examiner*—Michelle Lopez
(74) *Attorney, Agent, or Firm*—John Yun; Bruce S. Shapiro; Wesley Muller

(57) ABSTRACT

A safety mechanism for a hedge trimmer is disclosed. Thumb catches 1032, 1048, together with corresponding locking members are initially biased downwardly relative to corresponding actuator levers 1010, 1014, as a result of which actuation of a motor of the hedge trimmer is prevented. This prevents inadvertent one-handed actuation of the hedge trimmer. In order to actuate the hedge trimmer, the user holds one of the actuator levers 1010, 1014 the corresponding thumb catch 1032 or 1048 upwardly, which causes movement of the other thumb catch towards its release position to allow pivotable movement of the actuator levers 1010, 1014 relative to a handle of the hedge trimmer. Movement of one of the actuator levers 1010, 1014 relative to the handle brings the lever 1018 into engagement with the electrical switch assembly 1008 to actuate the motor of the hedge trimmer. When the actuator levers 1010, 1014 are released, torsion springs urge the actuator levers 1010, 1014 and locking members outwardly relative to the handle housing 1004, as a result of which the locking members are urged into a locking position to prevent further actuation of actuator levers 1010, 1014 until the thumb catches 1032, 1048 have again been slid out of their locking position.

14 Claims, 29 Drawing Sheets

U.S. PATENT DOCUMENTS

| | | | |
|---|---|---|---|
| 5,724,737 A * | 3/1998 | Stones | 30/228 |
| 5,791,057 A * | 8/1998 | Nakamura et al. | 30/381 |
| 5,806,191 A * | 9/1998 | Yokoyama et al. | 30/216 |
| 5,915,795 A * | 6/1999 | Nakamura et al. | 30/382 |
| 5,969,312 A * | 10/1999 | Svetlik et al. | 200/61.85 |
| 6,105,263 A * | 8/2000 | Stones et al. | 30/382 |
| 6,178,642 B1 * | 1/2001 | Schaer | 30/216 |
| 6,206,162 B1 * | 3/2001 | Stones et al. | 192/69.7 |
| 6,548,776 B1 * | 4/2003 | Jong | 200/334 |
| 6,698,566 B2 * | 3/2004 | Jong | 192/131 R |
| 6,878,888 B1 * | 4/2005 | Jong | 200/43.17 |
| 2005/0076510 A1 * | 4/2005 | Stones | 30/208 |
| 2005/0102840 A1 * | 5/2005 | Stones | 30/210 |
| 2005/0102842 A1 * | 5/2005 | Stones | 30/210 |
| 2005/0126009 A1 * | 6/2005 | Stones | 30/100 |

FOREIGN PATENT DOCUMENTS

| | | |
|---|---|---|
| DE | 24 505 77 A1 | 5/1976 |
| DE | 36 389 52 A | 5/1988 |
| EP | 02 14 455 A1 | 3/1987 |
| EP | 0 687 410 A1 | 6/1995 |
| EP | 1 131 994 A1 | 9/2001 |
| GB | 1 193 6 54 | 6/1970 |
| GB | 2 336 987 A | 11/1999 |
| GB | 2 363 520 A | 12/2001 |
| GB | 2 384 678 A | 8/2003 |
| GB | 2 396 580 A | 6/2004 |
| JP | 2002058341 A | 2/2002 |

* cited by examiner

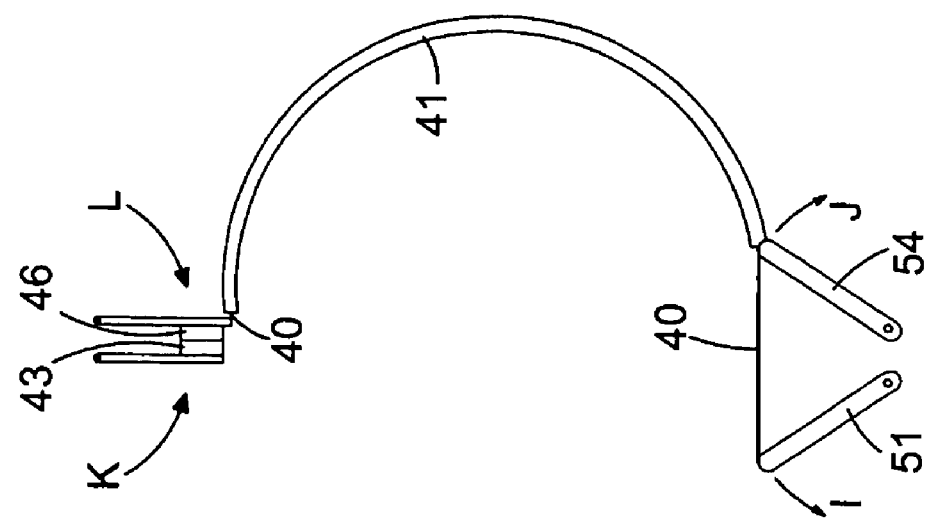
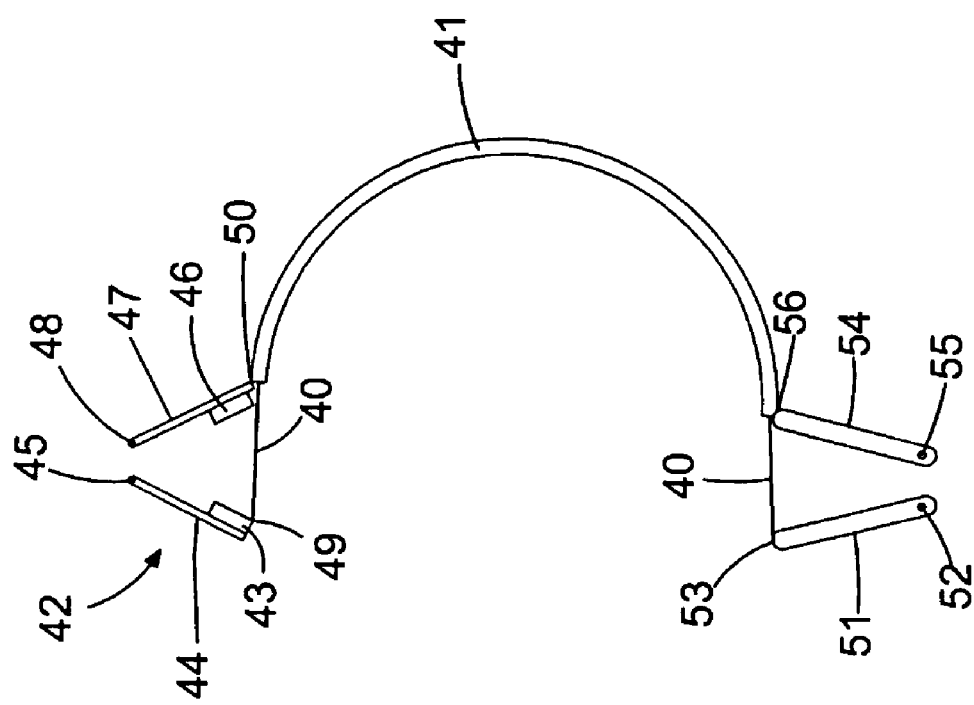

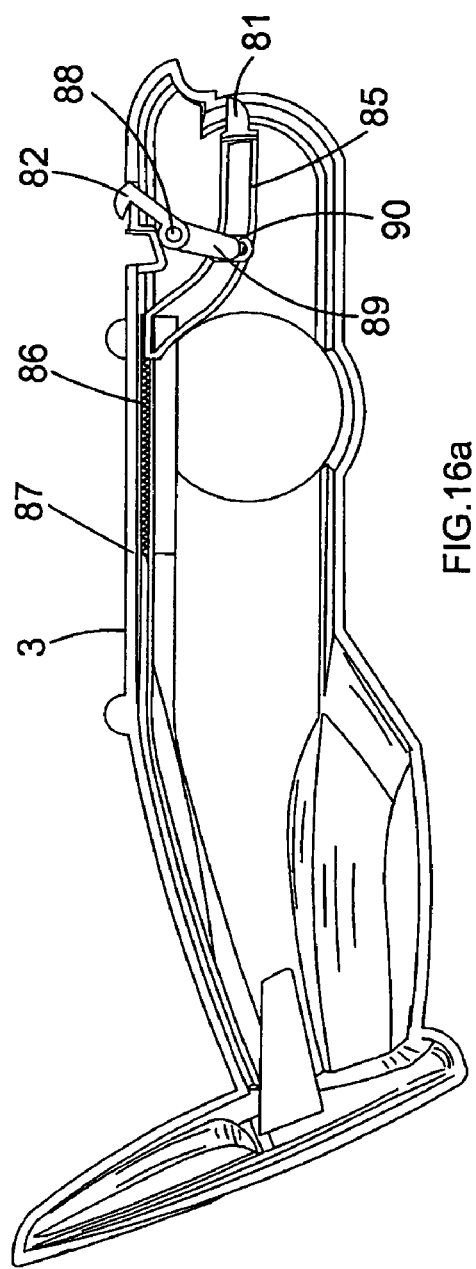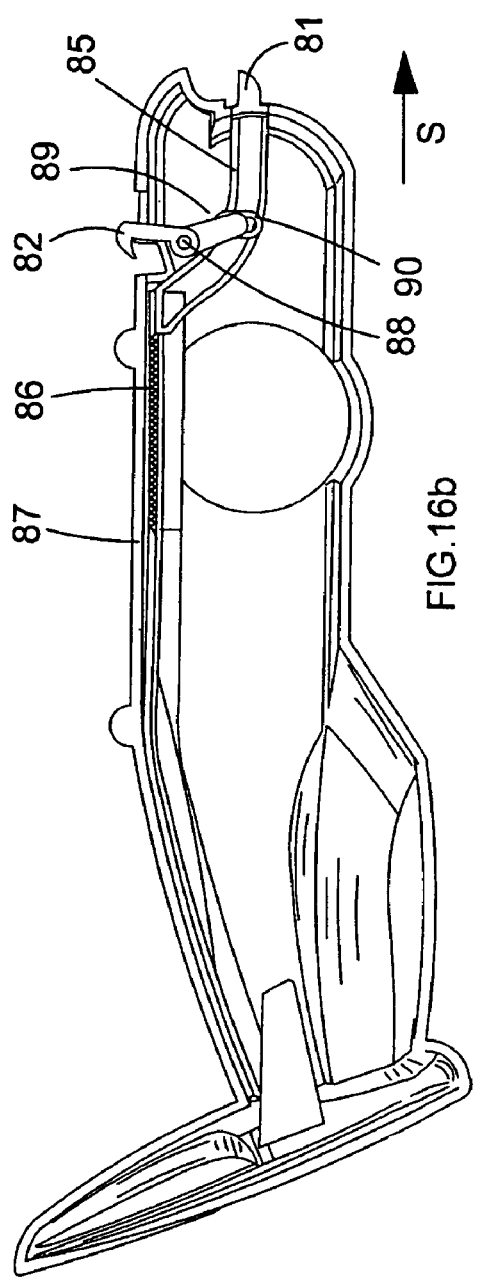

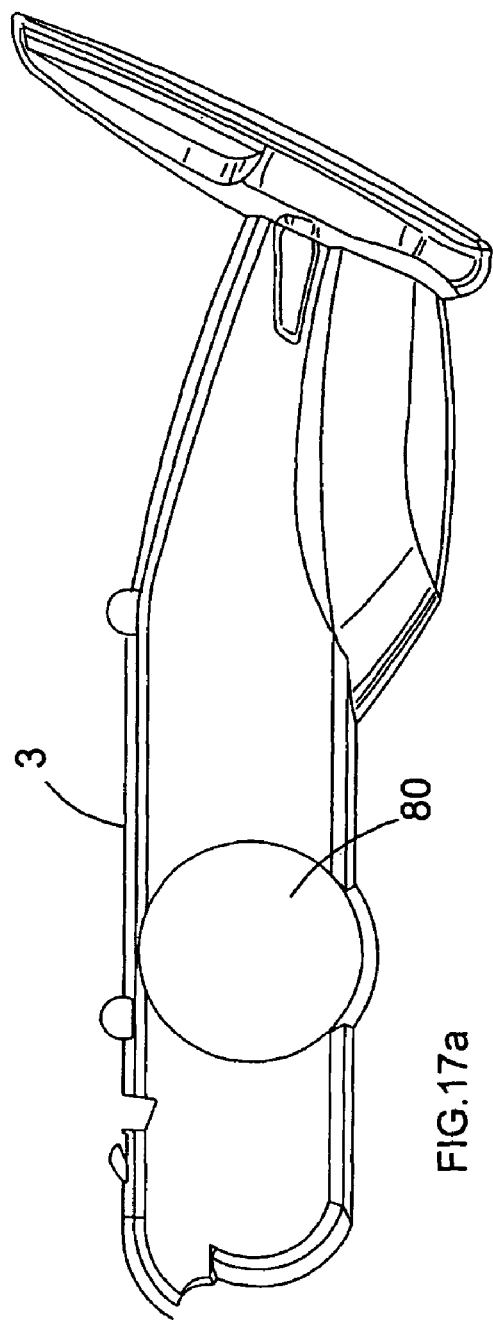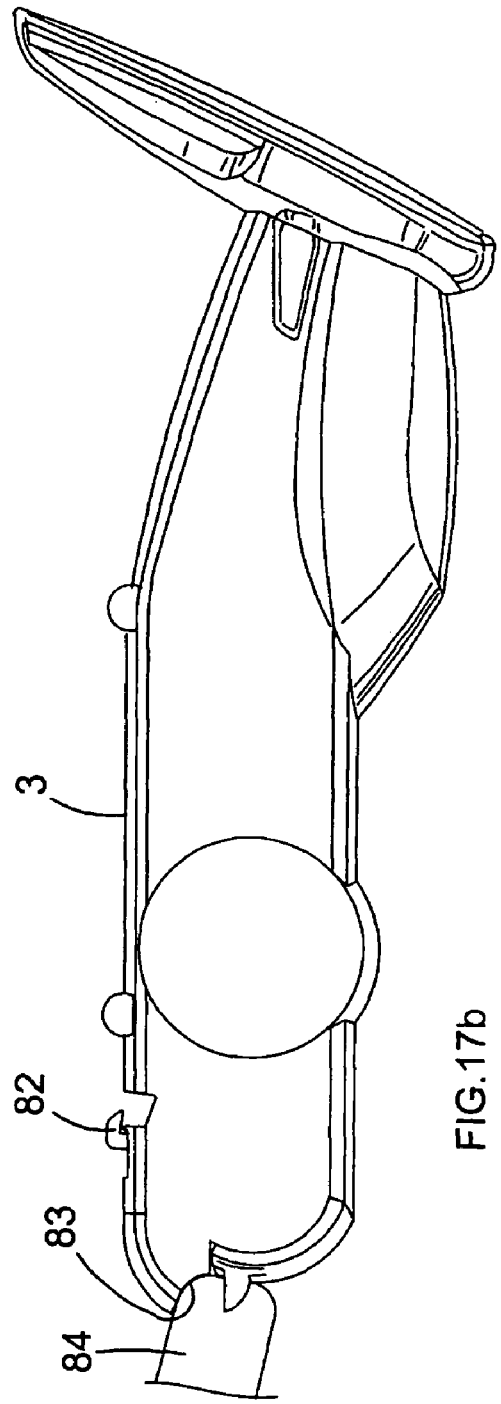

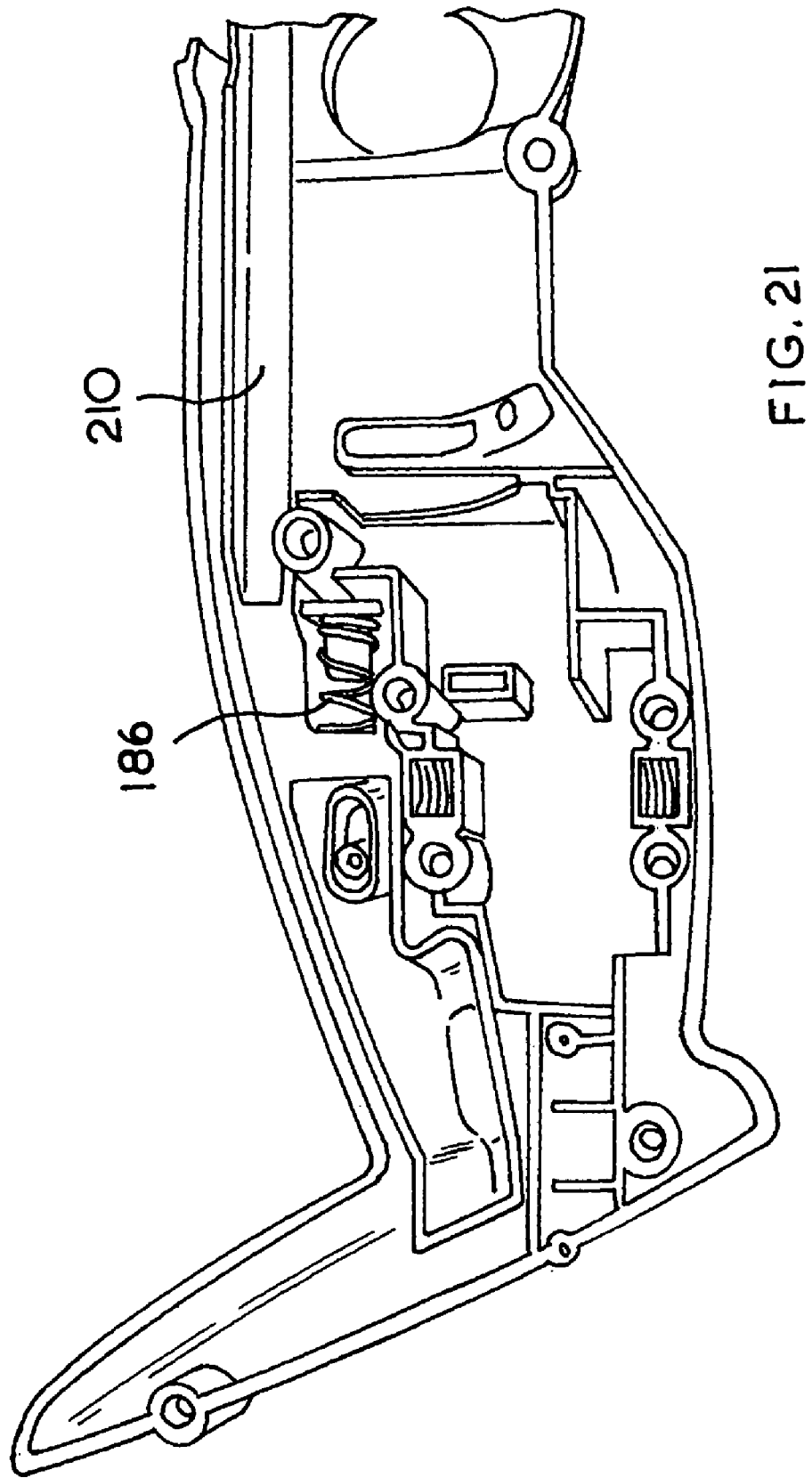

SAFETY MECHANISM FOR POWER TOOL AND POWER TOOL INCORPORATING SUCH MECHANISM

BACKGROUND OF THE INVENTION

The present invention relates to a safety device for a power tool, and relates particularly, but not exclusively, to an actuator assembly for preventing unintended actuation of a hedge trimmer, and to a power tool incorporating such an assembly.

Hedge trimmers are power tools for general garden use with an axially reciprocating blade comprising a plurality of teeth disposed adjacent a stationary blade, the teeth of the stationary blade providing a reaction force for the teeth of the reciprocating blade.

Most hedge trimmers are provided with two handles for a user to grip. This is generally for two reasons. Firstly, a hedge trimmer is easier to manipulate when held with both hands than when held with one hand. This provides the user with greater control over the hedge trimmer and therefore facilitates more accurate cutting. Secondly, a two handed grip is a safety feature. It is significantly easier to lose control of a hedge trimmer when holding it with one hand, and therefore a two handed grip allows much safer use of the hedge trimmer.

It is known to provide a safety mechanism for a hedge trimmer in which electrical switches for actuating the hedge trimmer motor are connected to both handles, so that the trimmer motor can only be actuated when both handles are held by the user. This prevents one-handed use of the hedge trimmer. However, hedge trimmers which can be actuated using one hand only are sometimes available, and such hedge trimmers suffer from the drawback that accidents may occur as a result of inadvertent one-handed actuation of the hedge trimmer.

Preferred embodiments of the present invention seek to overcome the above disadvantage of the prior art.

SUMMARY OF THE INVENTION

According to an aspect of the present invention, there is provided an actuator assembly for a power tool having at least one handle, a tool housing containing a motor, and a working member adapted to be actuated by means of the motor, the assembly comprising:— at least one actuator member adapted to be moved relative to a handle of the tool between a respective first position to actuate electrical switch means to actuate the motor, and a respective second position in which the electrical switch means is not actuated; and at least one respective locking member mounted to the or each said actuator member, wherein the or each said locking member is movable relative to the corresponding said actuator member between a respective first position in which actuation of said actuator member is permitted and a respective second position in which actuation of the or each said actuator member is prevented.

This provides the advantage of providing a safety mechanism for locking the tool in an off condition so that the risk of inadvertent one-handed actuation of the tool is minimised.

At least one said locking member may be adapted to abut at least one respective abutment on the corresponding said handle when in the second position thereof to prevent movement of the corresponding said actuator member relative to the handle to the respective first position of said actuator member.

At least one said locking member may be slidable relative to the corresponding said actuator member between the respective first and second positions of said locking member.

The assembly may comprise a plurality of said actuator members.

The assembly may further comprise first biasing means for urging at least one said locking member towards the second position thereof.

This provides the advantage of automatically urging the tool to a locked off, safer condition.

Said first biasing means may comprise at least one spring.

The first biasing means may comprise first interconnecting means for interconnecting a plurality of said locking members.

The first interconnecting means may comprise at least one tension cable.

The assembly may further comprise second interconnection means for preventing at least one said actuator member from being in the first position thereof when a further said actuator member is in the first position thereof.

The second interconnection means may comprise at least one interconnecting member pivotally attached adjacent end portions of a pair of adjacent said actuator members.

At least one said interconnection member may be adapted to actuate said electrical switch means as a result of at least one corresponding actuator member moving to the first position thereof.

The assembly may further comprise second biasing means for urging at least one said actuator member towards a second position thereof.

Said second biasing means may comprise at least one torsion spring.

According to another aspect of the present invention, there is provided a handle assembly for a power tool, the handle assembly comprising a handle housing, electrical switch means for actuating an electric motor of the tool, and an actuator assembly as defined above for actuating said electrical switch means.

According to a further aspect of the present invention, there is provided a power tool comprising a handle assembly as defined above, a tool housing, a motor within the tool housing, and a working member adapted to be actuated by said motor.

BRIEF DESCRIPTION OF THE DRAWINGS

Preferred embodiments of the present invention will now be described, by way of example only and not in any limitative sense, with reference to the accompanying drawings in which:—

FIG. 10b is a top view of the gear conversion mechanism of FIG. 10a;

FIG. 12 is a schematic view of a switching mechanism of the present invention in the open position;

FIG. 13 is a schematic view of the switching mechanism of FIG. 12 in the closed position;

FIG. 16a is a cross sectional side view of the hedge trimmer housing with the latch mechanism in the open position;

FIG. 16b is a cross sectional side view of the hedge trimmer housing of FIG. 16 with the latch mechanism in the closed position;

FIG. 17a is a side view of the hedge trimmer housing, with the latch mechanism in the open position;

FIG. 17b is a side view of the hedge trimmer housing of FIG. 16a, with the latch mechanism in the closed position and engaging the hedge trimmer handle assembly;

FIG. 21 is an internal view of a front part of the housing of FIG. 20;

DETAILED DESCRIPTION OF THE DRAWINGS

Figure 1:
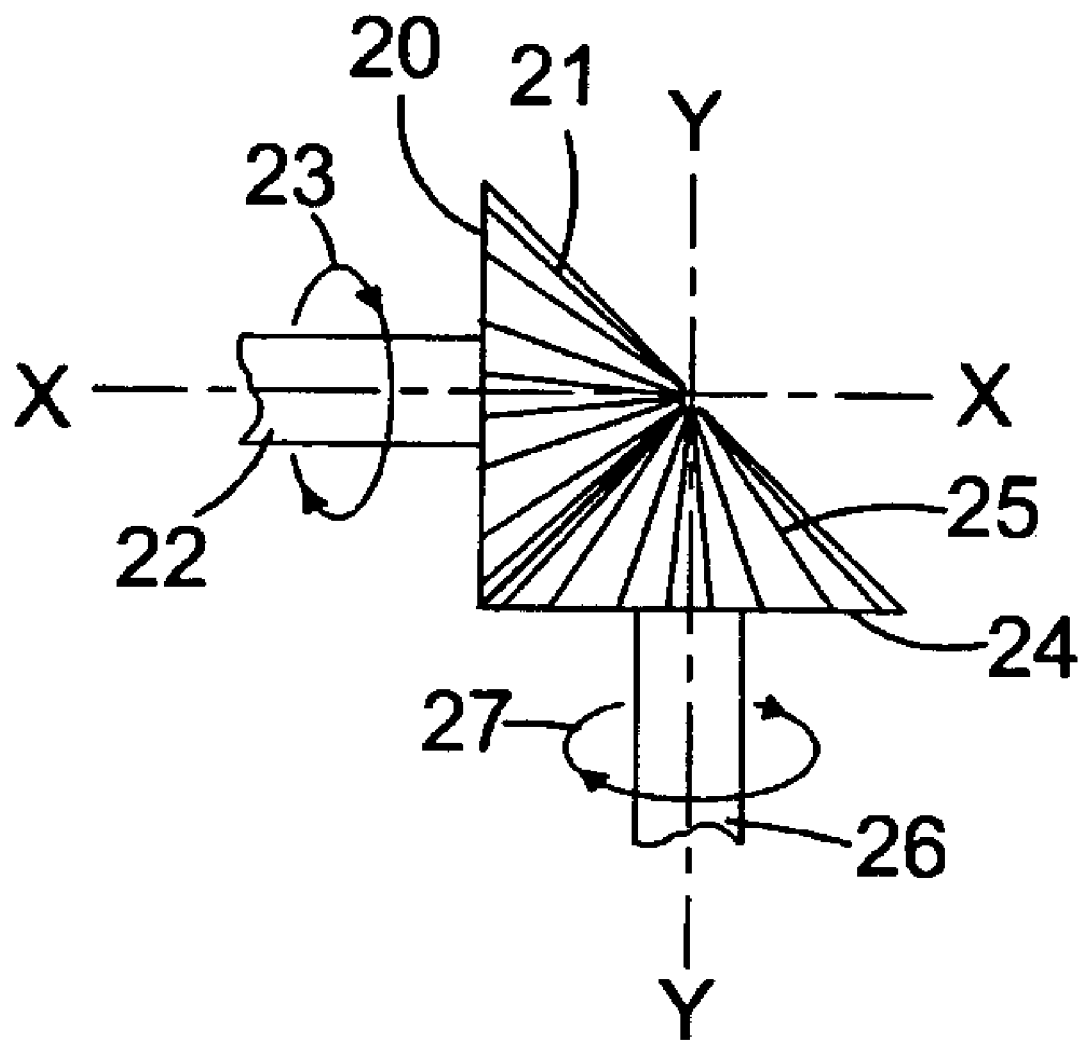
FIG. 1 is a side view of a prior art truncated conical bevel gear assembly for use in a hedge trimmer.
Figure 2:
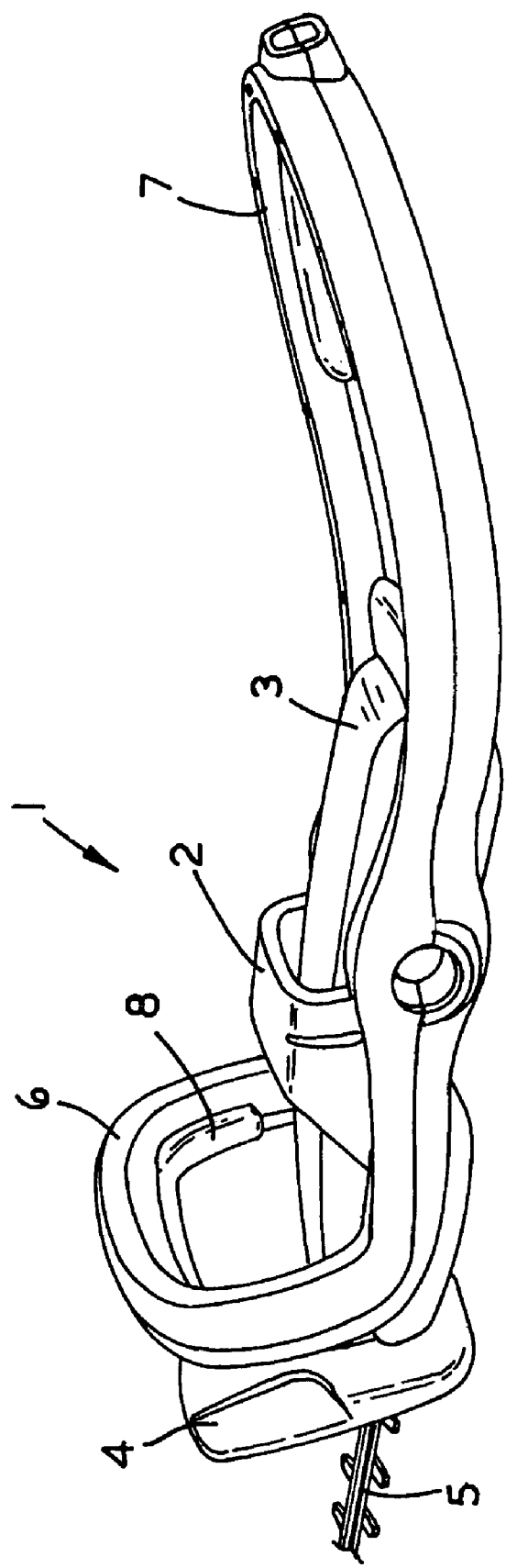
FIG. 2 is a perspective view from a first side of a hedge trimmer of a first embodiment of the present invention.

Referring to FIG. 2, a hedge trimmer (1) comprises a handle assembly (2) formed from durable plastics material pivotably connected to a housing (3). A guard (4) is formed integrally with the housing (3) and an electric motor (not shown) is disposed axially within the housing (3) such that the axis of rotation of an output shaft (not shown) of the motor is generally parallel to the direction of reciprocating motion of a blade assembly (5).

The blade assembly (5) extends forwardly of the housing (3). The electric motor (not shown) is connected to the blade assembly via a drive conversion mechanism, the operation of which will be described in further detail below. The blade assembly (5) comprises a stationary blade disposed adjacent to a blade adapted to execute reciprocating movement along a longitudinal axis of the stationary blade. In this way, the stationary blade provides a reaction force for the reciprocating blade to grip against and cut. The operation of this type of blade assembly is well known in the art and will not be described in any further detail herein.

The handle assembly (2) comprises a forward handle (6) and a rear handle (7). Both forward and rear handles (6), (7) are formed integrally from moulded durable plastics and enable a user to hold the hedge trimmer in a variety of ways. As is well known in the art, it is desirable for certain power tools such as chainsaws, hedge trimmers and circular saws to have two handles for the user to grip, one with either hand. A two-handle assembly has two advantages. Firstly, when the tool is gripped in both hands it is more stable in the user's hands and therefore easier to control, which enables more accurate and precise cutting. Secondly, a two-handed grip on the hedge trimmer is a lot safer than a single-handed grip. It is a lot easier for a user to lose control of a hedge trimmer when gripping it with only one hand.

Figure 3:
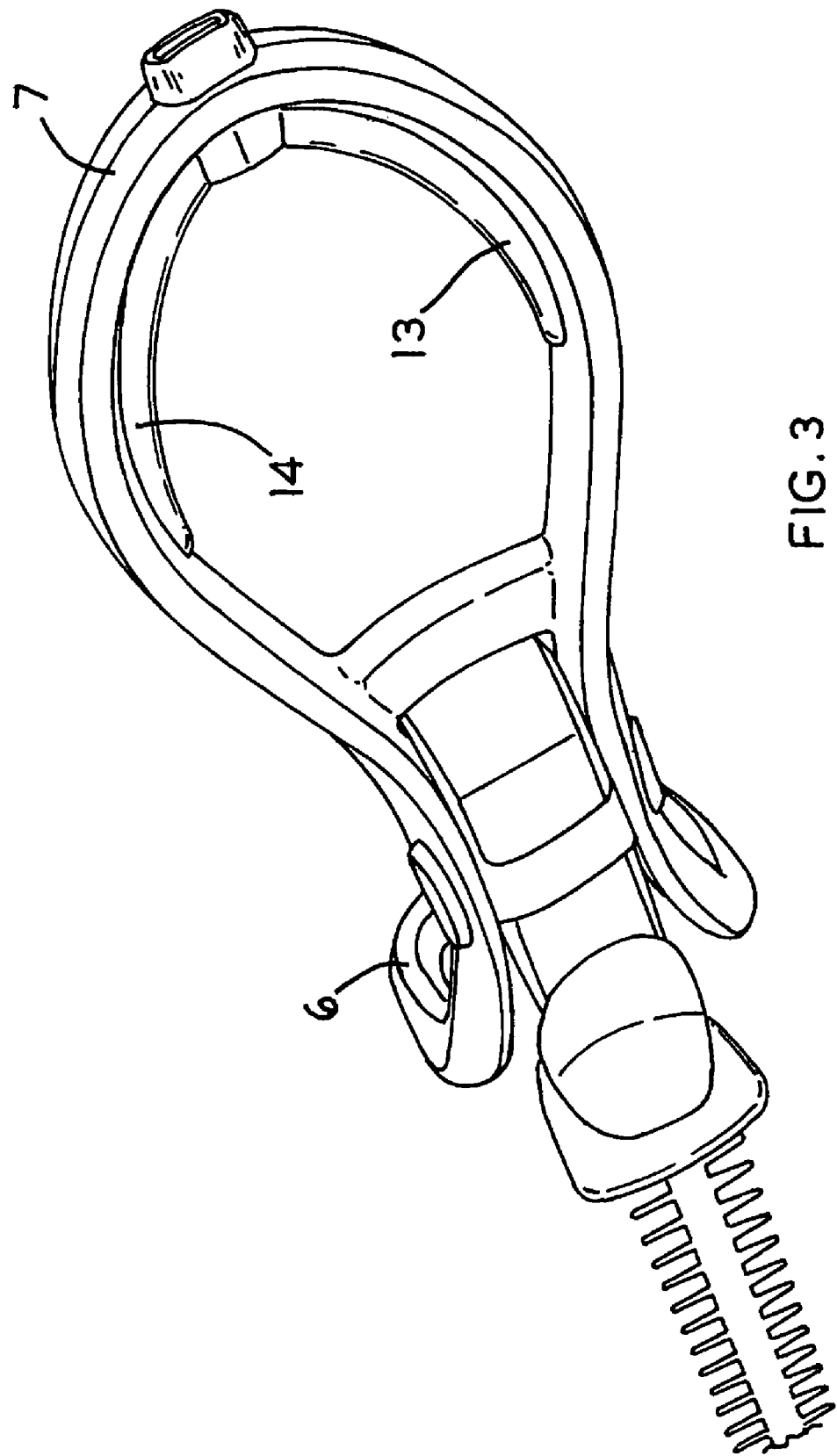
FIG. 3 is a perspective view from below of the hedge trimmer of FIG. 2.

The hedge trimmer is provided with a dual switching mechanism. In order to activate the hedge trimmer, the user must simultaneously depress a forward switch (8) and either one of rear switches (13), (14), as shown in FIG. 3. As a result, it is impossible for the user to activate the hedge trimmer without first gripping it with both hands.

Figure 4:
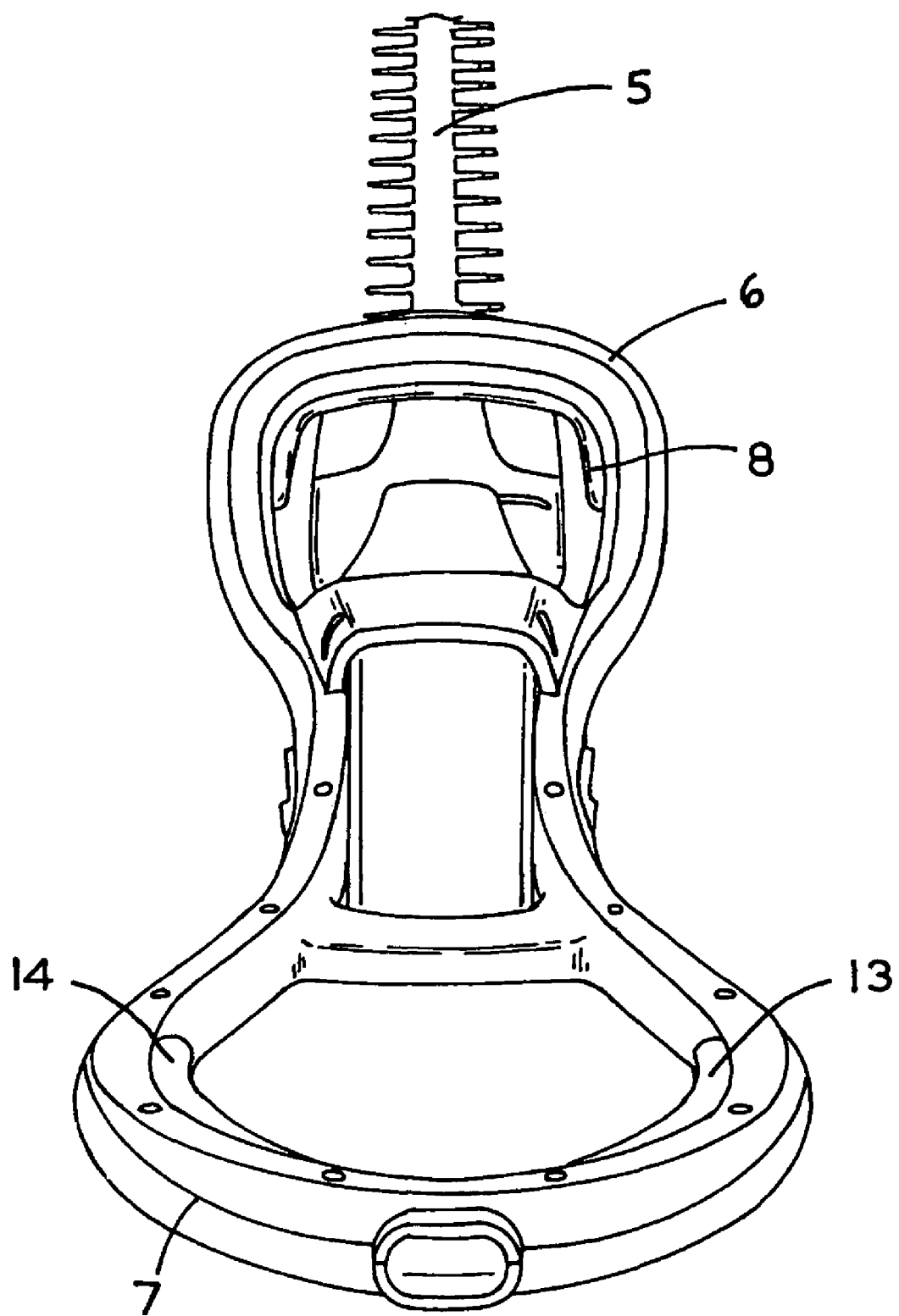
FIG. 4 is a rear perspective view of the hedge trimmer of FIG. 2.

It is desirable when operating a hedge trimmer with the blade in the vertical plane for the user to be able to grip the hedge trimmer without twisting either wrist at an angle relative to the other. Referring to FIG. 4, the present invention provides a handle assembly which allows a left-handed user and a right-handed user to operate the hedge trimmer in any orientation with the wrists of each arm aligned, i.e. with the wrists arranged along parallel axes. For example, the right-handed user would grip forward handle (6) with his left hand such that the fingers of his left hand pass around the front of forward handle (6) and grip switch (8) with the fingertips of his left hand. The right-handed user would place his right hand around rear handle (7) such that the fingertips of his right hand grip switch (13). It can be seen that in this orientation the right-handed user holds the hedge trimmer such that the insides of his wrists are facing each other and his wrists are aligned in planes generally parallel to the plane of the blade. The same can be said of the left-handed user. However the left-handed user would grip forward handle (6) with his right hand and rear handle (7) with his left hand such that the fingertips of his left hand are in a position to depress switch (14).

This feature of the present invention offers several advantages over the prior art. Firstly, holding the hedge trimmer without a twist in the user's arm is more comfortable, and affords the user more control over the hedge trimmer blade. Secondly, prior art hedge trimmers must be held with a twist in the user's arm. Over prolonged periods of use, the user's arms may tire, and apply an unwanted torque to the hedge trimmer as the muscles of the user's forearms attempt to orientate themselves into a more comfortable position. This makes it more difficult to accurately cut with the hedge trimmer.

Figure 5:
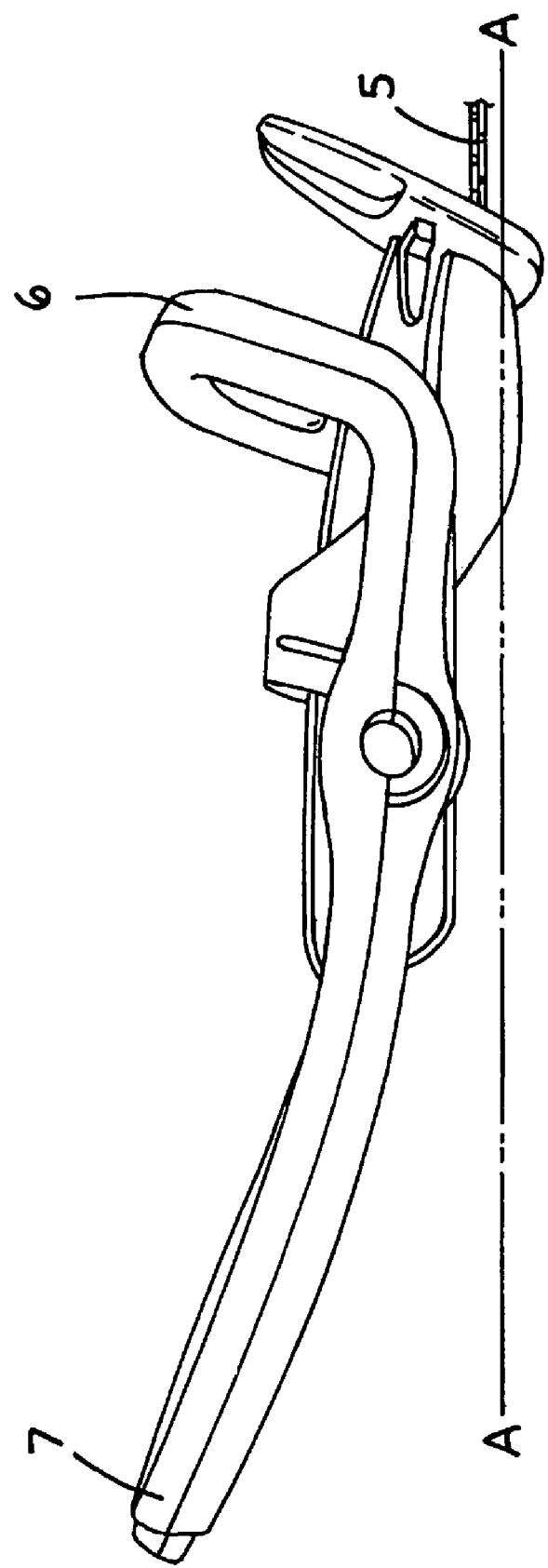
FIG. 5 is a side perspective view of the hedge trimmer of FIG. 2, from the opposite side as that shown in FIG. 2.

Referring to FIG. 5, line A-A represents the plane of blade assembly (5). The plane of rear handle (7) is at an angle to line A-A such that the rear part of rear handle (7) is raised substantially away from the plane of blade (5). As a result of this, the knuckles of the hand of the user that is gripping rear handle (7) are raised away from the surface of the hedge being cut. This provides the advantage that the user's knuckles avoid any grazing or cutting resulting from contact with the hedge, or with the ground when carrying out low cutting.

Figure 6:
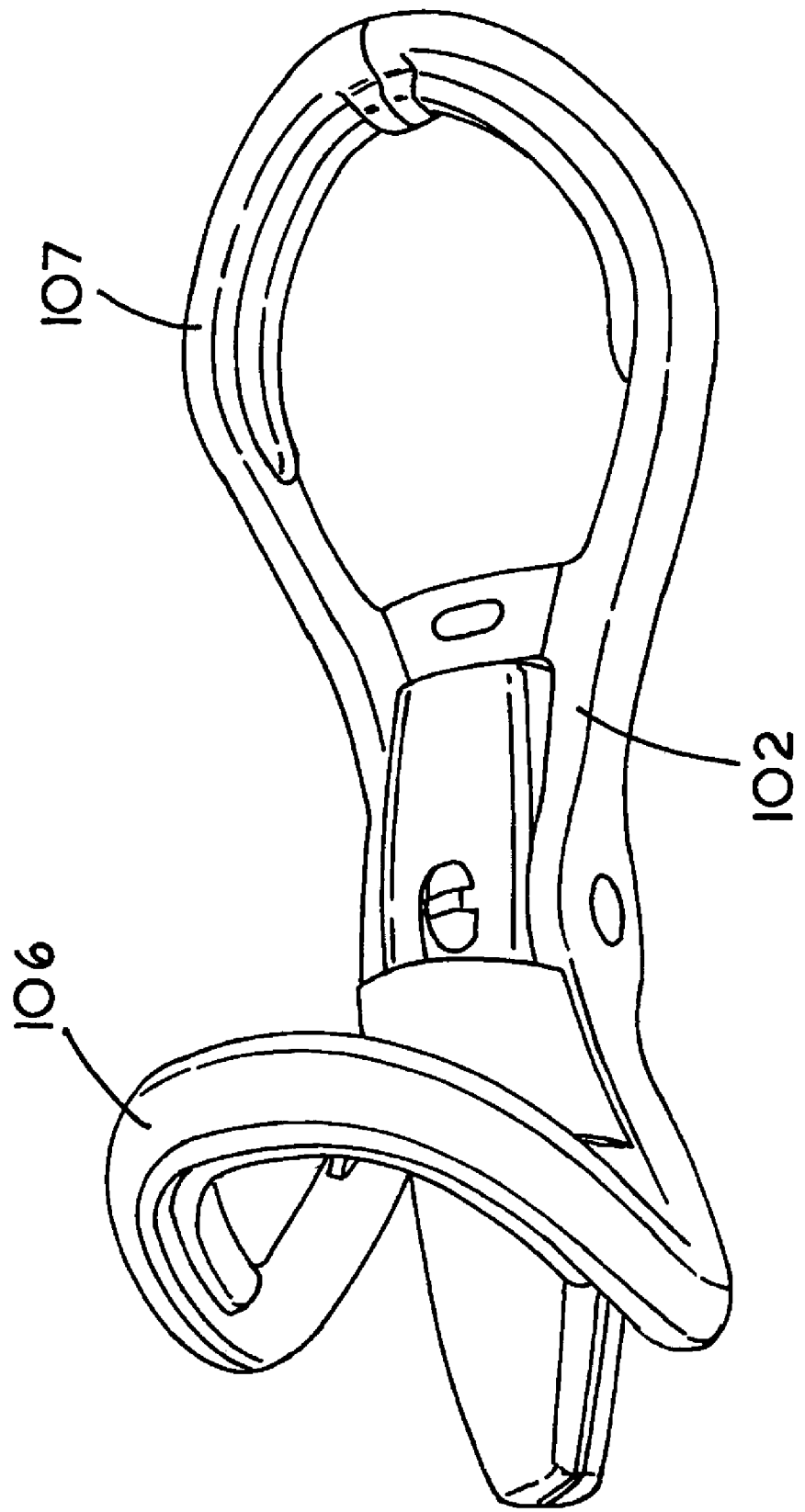
FIG. 6 is a perspective view from above of a hedge trimmer of a second embodiment of the present invention.
Figure 7:
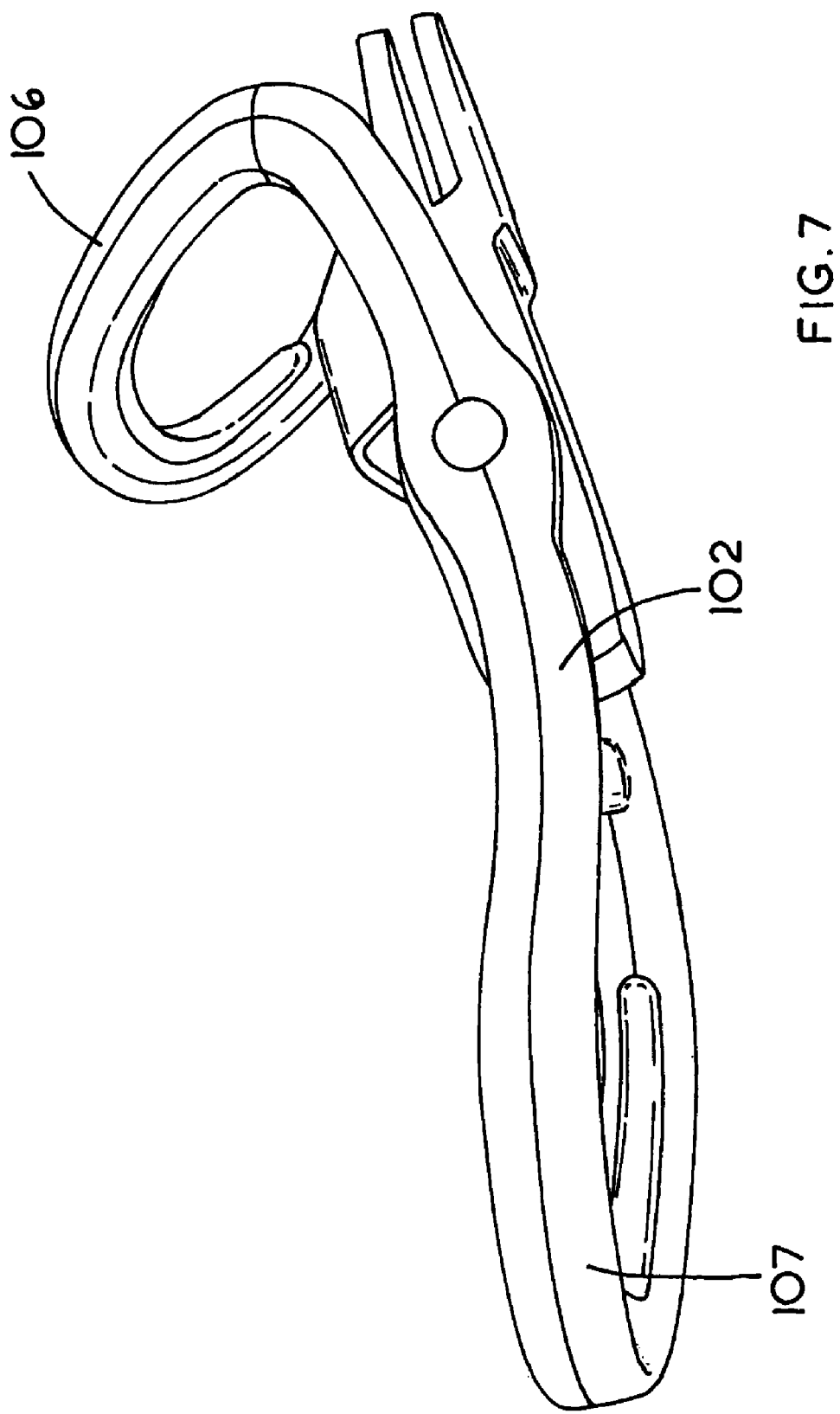
FIG. 7 is a side perspective view of the handle assembly and body of the hedge trimmer of FIG. 6.

Referring to FIGS. 6 and 7, in which parts common to the embodiment of FIGS. 2 to 5 are denoted by like reference numerals but increased by 100, a second embodiment of the handle assembly (102) is shown. It can be seen that front handle (106) is swept back at a greater angle relative to the plane of the blade compared with the angle of front handle (6) relative to the plane of blade (5) as shown in FIG. 5. This feature makes the hedge trimmer more comfortable for the user to operate provided that the centre of mass of the hedge trimmer lies in the region between front handle (106) and rear handle (107) which will usually be the case, since the heaviest parts of the hedge trimmer are generally the blade and the motor housing. The user does not have to stretch his forward arm as far relative to the rear handle as he would do when using the handle assembly shown in FIG. 5.

It is therefore desirable to have the rear handle located as far away from the centre of mass as is possible. Since the two heaviest components of a hedge trimmer are generally the electric motor disposed in the housing and the forward blade assembly, the centre of mass of the hedge trimmer generally lies between the motor and the blade.

In order to make the hedge trimmer easier to manipulate, it is desirable to locate the rear handle (7), (107) as far away from the centre of mass as possible. This is because the further away the rear handle is from the centre of mass, the less force is needed to be applied to the rear handle to apply the same torque to the hedge trimmer. One way of achieving this is to make the rear handle as large as possible without increasing the weight of the rear handle, and for this reason the rear handle (7), (107) of the hedge trimmer is formed into the curved bar loop shape with a space enclosed as is best shown in FIG. 2 or in FIG. 6.

The handle assembly (7) of the present invention enables the user to operate the hedge trimmer for cutting a horizontal surface such that the wrists of the user's arms are oriented generally parallel to one another. Also, as described above, when the blade is required to be operated in the vertical plane, the user can operate the hedge trimmer with his wrists arranged in generally parallel vertical planes.

A problem can arise with prior art hedge trimmers when a horizontal surface to be cut is high up relative to the user such as the horizontal upper surface of a tall hedge, as the user may have to stretch and hold the hedge trimmer above his head. This is undesirable for the user especially when the user is on stepladders or other apparatus to raise the user from the ground. When the user is holding the hedge trimmer high up relative to his body or even holding the hedge trimmer above his head in order to cut a horizontal surface, the user is less stable than he would be were he operating the hedge trimmer further down relative to his body. Furthermore, although hedge trimmers can generally be operated upside down, it has been found that consumers are generally very reluctant to operate hedge trimmers upside down whilst held above the head.

Figure 8:
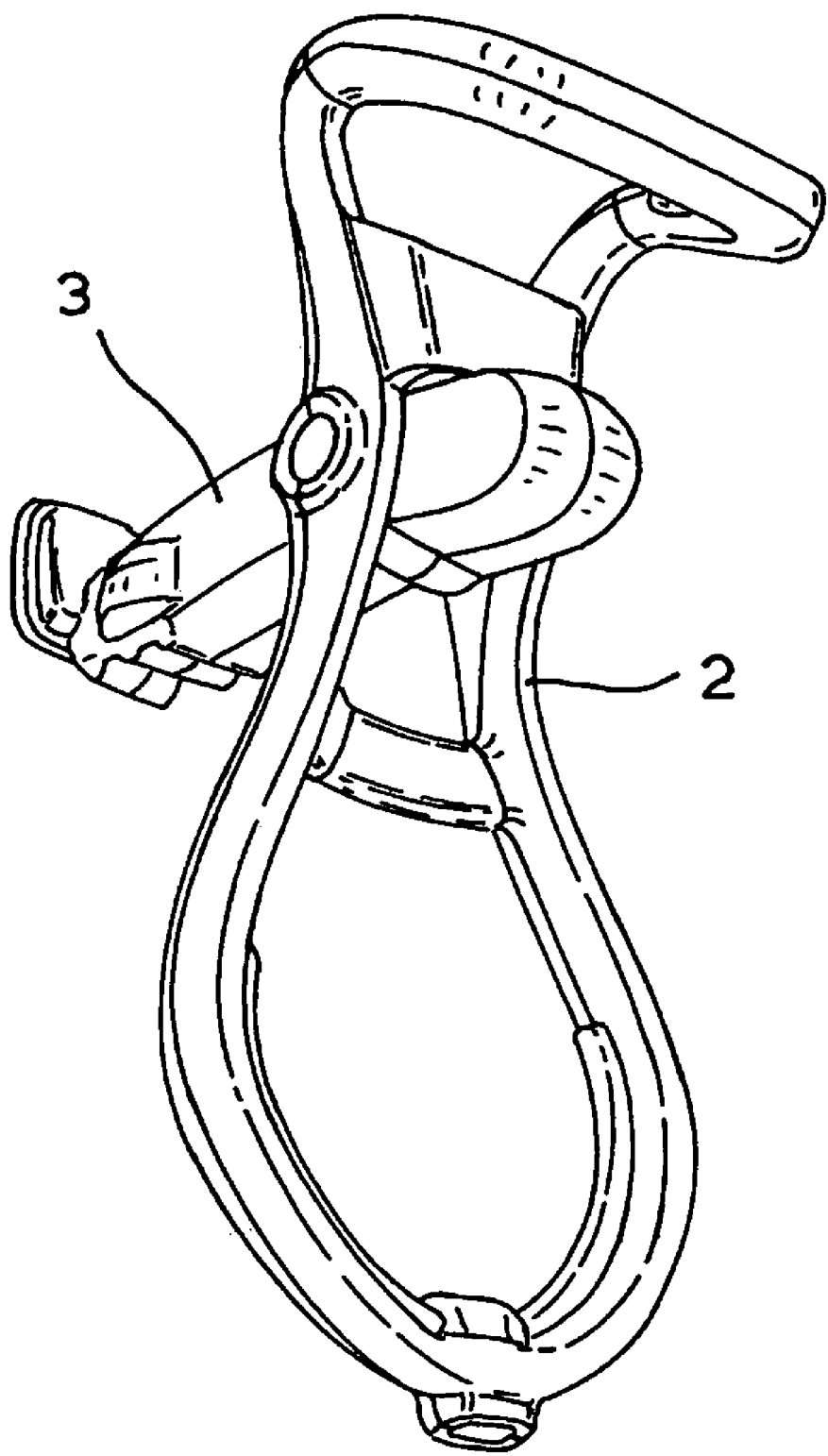
FIG. 8 is a side and rear perspective view of the handle assembly and body rear of the hedge trimmer of the present invention with the body portion tilted at an angle to the handle assembly.
Figure 9:
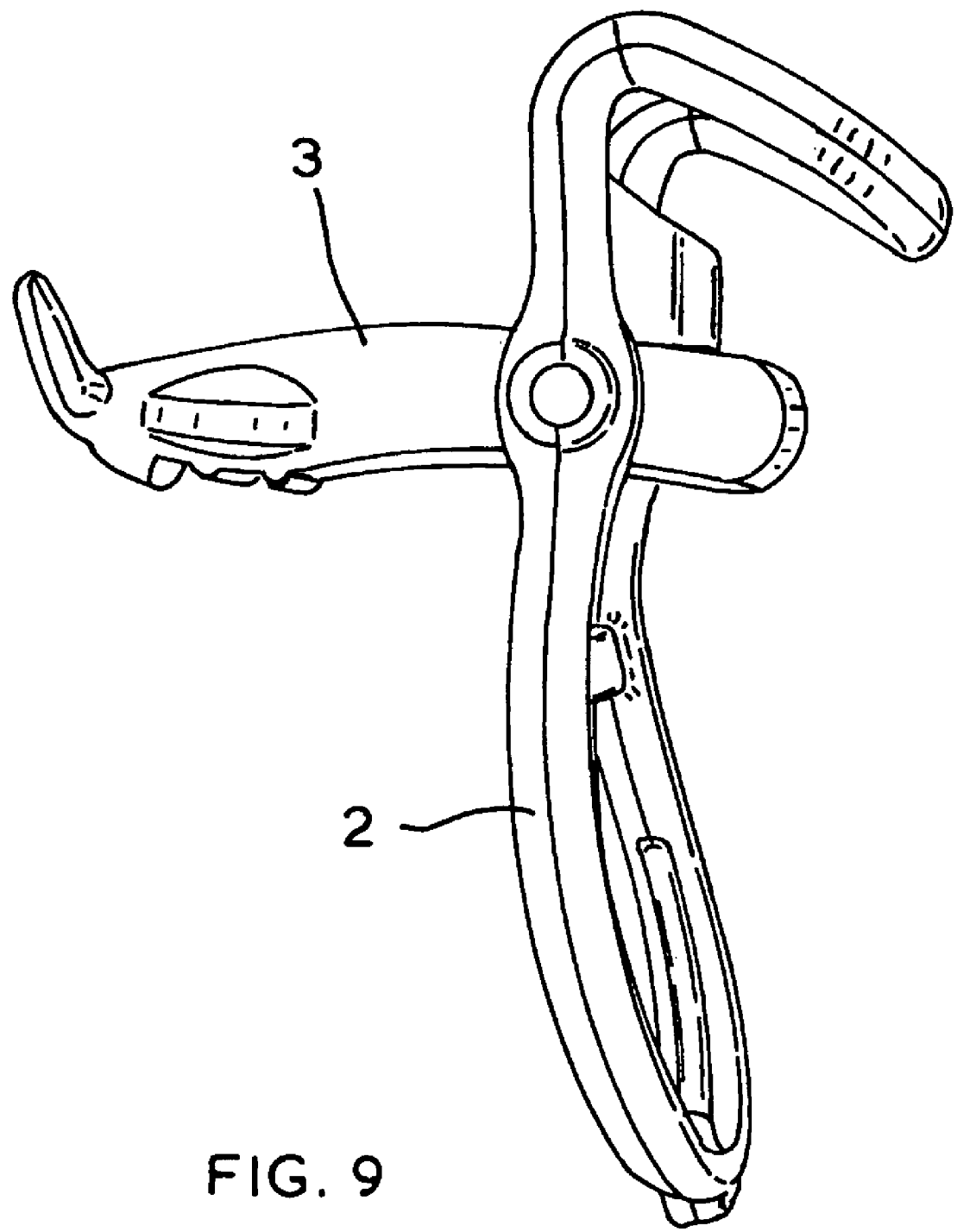
FIG. 9 is a further side perspective view of the hedge trimmer of FIG. 8.

Referring to FIGS. 8 and 9, the hedge trimmer is shown without the forwardly projecting blade where the body housing (3) has been pivoted relative to the handle assembly (2). In this orientation, the hedge trimmer is operated in exactly the same way as before, with the user gripping both forward and rear handles and depressing forward and rear switches respectively. This feature makes it easier for the user to view along the plane of the blade when cutting the top of a tall hedge, and more comfortable for horizontal cutting in a position high up relative to the user's body. This is because instead of the user having to hold the handles horizontally at eye level as with prior art hedge trimmers, the user can now hold the handle assembly in front of his body whilst looking along the plane of the blade.

Referring to FIGS. 16a and 16b, the operation of the latch mechanism for holding the hedge trimmer in either of the orientations described above will now be described.

A first retaining member (81) is mounted at a first end of a bracket (85), and the other end of bracket (85) is mounted on a compression spring (86). Compression spring (86) is fixed to the body of the jigsaw housing at (87). A second retaining member (82) is able to pivot about a pin (88), pin (88) being fixed relative to the housing (3). Second retaining member (82) is also rigidly fixed to a first end of a lever (89), the second end of lever (89) being slidable in a second bracket (90), second bracket (90) being formed in first bracket (85).

When the first bracket (85) is moved in the direction of arrow S from the configuration shown in FIG. 16a to the configuration of FIG. 16b as a result of compression spring (86) extending, it can be seen that firstly the first retaining member (81) is pushed out of the back of the housing (3). Secondly, as a result of lever (89) sliding upwardly in second bracket (90), the second retaining member (82) is pivoted about pin (88) and out of housing (3).

In the configuration of FIG. 16b, either the first or second retaining means (81, 82) will engage with a corresponding portion of the handle assembly (not shown), and a user would release the mechanism simply by pushing the retaining member which is not in engagement with the handle assembly back into the housing, as this action would also result in retracting the other retaining member from engagement with the handle assembly.

Referring to FIGS. 17a and 17b, the hedge trimmer housing (3) engages the hedge trimmer handle assembly at a cylindrical pivot (80) such that the housing (3) can rotate about pivot portion (80). The hedge trimmer can be operated in two separate orientations, the in-line orientation as shown in FIG. 2, or the orientation shown in FIGS. 8 and 9 where the hedge trimmer housing (3) is rotated through 90° relative to the hedge trimmer handle assembly (2).

In order to retain the hedge trimmer housing (3) in position relative to the handle assembly (not shown), the housing (3) is provided with a first retaining member (81) and a second retaining member (82). Both first and second retaining members (81, 82) are retractable relative to the housing (3), and are shown in their respective retracted positions in FIG. 17a. The rear end of housing (3) has an integrally formed abutment surface (83) shaped to receive an engaging portion (84) of handle assembly (2). It can be seen that the engaging portion (84) of the handle assembly is received between abutment surface (83) of the housing (3) and the first retaining member (81) such that the engaging portion (84) can not move in either the upwards or downwards direction relative to housing (3). The first retaining member (81) is so shaped that the engaging portion (84) can slide into engagement with abutment surface (83) by displacing retaining member (81), but cannot move out of engagement with abutment surface (83) until retaining member (81) is retracted into the housing (3).

When the hedge trimmer is used in the orientation shown in FIGS. 8 and 9, second retaining member (82) grips a second engaging portion (not shown) of the handle assembly, and in this orientation even though first retaining member (81) is deployed, it is not in use. In order to release the latch mechanism, either first or second retaining members (81, 82) can be depressed by the user, depending on which one is not in engagement with the handle assembly, which simultaneously moves both first and second retaining members (81, 82) into the housing.

Referring to FIGS. 12 and 13, the dual switching mechanism of the present invention will now be described.

A Bowden cable, such as that used to operate the brakes on a pedal bicycle, consists of an inner cable (40) surrounded by an outer sheath (41). The inner cable (40) passes through the outer cable (41) and is slidable relative thereto. An electrical contact shown generally by (42) comprises a first metallic pad (43) mounted on an arm (44), the arm being pivotable about point (45) and a second metallic pad (46) mounted on a second arm (47), the second arm being pivotable about point 48 such that metallic pads (43) and (46) can be pivoted towards each other, and into contact.

A first end of inner cable (40) is attached to metallic pad (43) at point (49), and a first end of outer cable (41) is attached to arm (47) at point (50).

A first switch (51) on rear handle (107) (FIG. 6) comprises an arm that is pivotable about point (52), the arm being attached to a second end of inner cable (40) at point (53). A second switch (54) on rear handle (107) is pivotable about point (55) and is attached to the outer cable at point (56).

Referring to FIG. 13, first switch (51) and second switch (54) are operated by a user applying pressure and pivoting them away from each other in the direction shown by arrows I and J. As first switch (51) is rigidly attached to the inner cable (40), and second switch (54) is rigidly attached to the outer cable (41), the pivoting motion of the switches in opposite directions draws the inner cable (40) through outer cable (41), whilst at the same time second switch (54) pushes outer cable (41) around inner cable (40). As a result of this, inner cable (40) pulls first metallic pad (43) in the direction of arrow K, and outer cable (41) pushes the second metallic pad (46) in the direction of arrow L such that pads (43), (46) come into contact.

It can be seen then that if only one switch, either (51) or (54), is moved whilst the other switch remains in the open position, the resulting movement of the Bowden cable would only consist of independent movement of either the inner (40) or outer cable (41) such that the contact would only be half closed, as only one metallic pad would be moved into a contacting position. The contacts (43), (46) are then closed by actuating a switch (not shown) on front handle (106) (FIG. 6) to cause further movement of the inner cable (40) relative to the outer sheath (41).

It should also be appreciated that further embodiments of a switching mechanism of this type are possible with more than two switches. For example, a single inner cable (40) can be provided with a plurality of outer sheaths (41), each outer sheath moving independently of one another which provides the option of adding more switches and/or electrical contacts. It should also be noted that in practice, taking the example of a two switch mechanism, the mechanism will be set up such that closing one switch will have the result of partially closing the contact by more than half the distance required to fully close the contact, and closing the second switch will also have the result of more than half closing the contact. In this way, it is ensured that the contact will actually be closed when the switch on front handle (106) and one of the switches (51), (54) on rear handle (107) are simultaneously actuated. Table 1 below shows the various possible states of operation of the switches.

TABLE 1

| Condition of switch on front handle 6, 106 | Condition of switch 51, 54 on rear handle 7, 107 | Condition of motor |
|---|---|---|
| OFF | OFF | OFF |
| OFF | ON | OFF |
| ON | OFF | OFF |
| ON | ON | ON |

It should also be appreciated that FIGS. 12 and 13 are only a schematic representation of the switching mechanism, and in practice the contacts be in the form of something other than pivoting metallic pads, as will be described below.

Referring to FIGS. 14a to 15c, the operation of the pivoting switching mechanism will now be described.

Figure 14A:
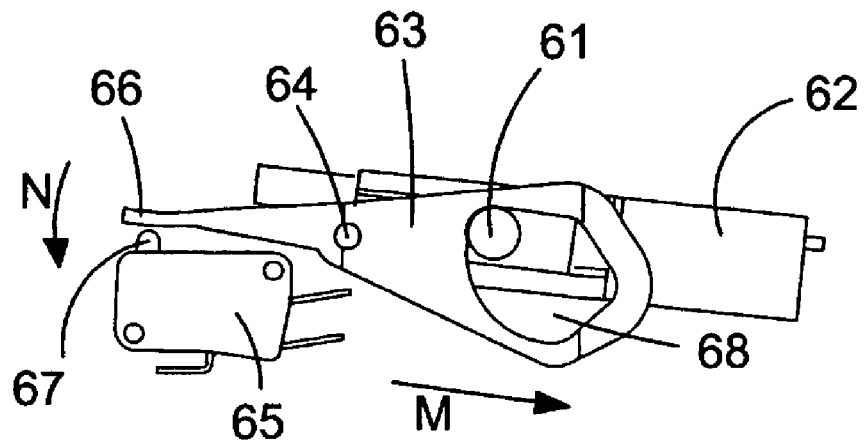
FIG. 14a is a side view of the switching mechanism and relay of the present invention in the open position where the handle assembly is in the horizontal orientation relative to the housing.

Referring to FIG. 14a, a pin (61) is held in a pin housing (62) which is disposed in the hedge trimmer handle assembly (not shown). The pin (61) and pin housing (62) are slidable relative to the hedge trimmer handle assembly (not shown) in the direction of arrow M. Pin (61) projects outwardly from housing (62) and is received in an aperture (68) formed in an arm member (63). Arm member (63) is mounted to the hedge trimmer body housing (not shown) by a pin (64). Arm member (63) is pivotable about pin (64) in the direction of arrow N relative to the hedge trimmer housing (not shown). An electrical relay (65) is disposed in the hedge trimmer housing (not shown) such that when arm (63) is pivoted in the direction of arrow N, a remote end (66) of arm (63) depresses a switch (67) and closes relay (65).

Figure 14B:
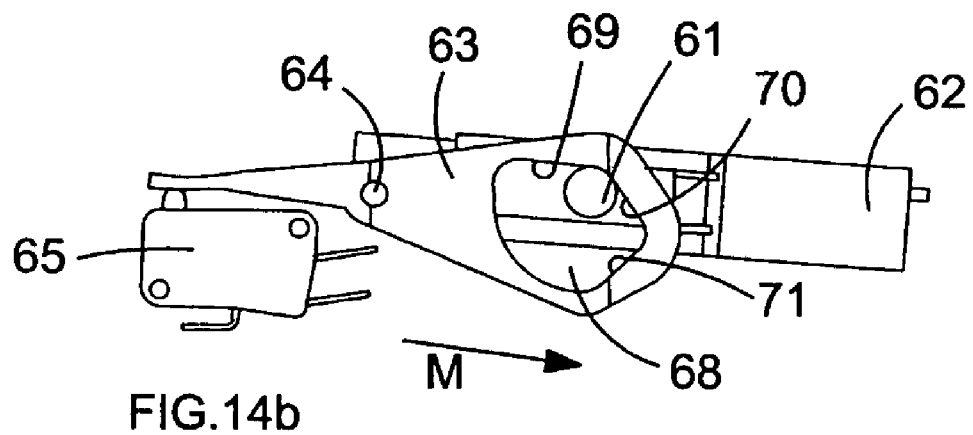
FIG. 14b is a side view of the switching mechanism of FIG. 14A in the partially closed position.
Figure 14C:
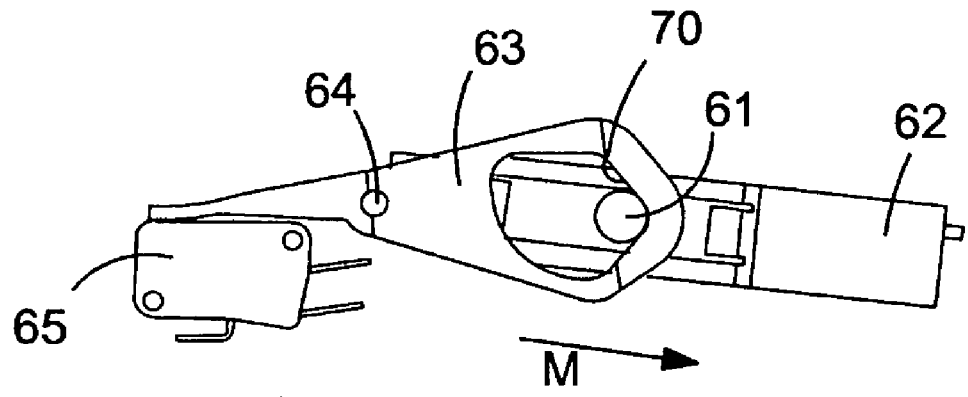
FIG. 14c is a side view of the switching mechanism and relay of FIG. 14A in which the relay is closed.

Referring now to FIG. 14b, when a first switch (not shown), is depressed by the user, a cable (not shown) causes pin (61) to slide in the direction of arrow M along cam surface (69) provided in aperture (68). It can be seen, however, that the movement of pin (61) is insufficient to cause arm member (63) to pivot about pin (64) and close relay (65). Referring now to FIG. 14c, in order to close the relay, the user must depress a second switch (not shown) provided on the handle assembly, which causes pin (61) to slide a further distance in the direction of arrow M along a second cam surface (70), provided in aperture (68), causing arm member (63) to pivot about point (64) and close the relay (65).

It can therefore be seen that in order to close the relay (65), a user must depress both first and second hedge trimmer switches, which in the embodiment of the hedge trimmer shown in FIG. 4 for example, would be switch (8) formed on front handle (6) and either one of switches (13), (14) formed on rear handle (7).

Figure 15A:
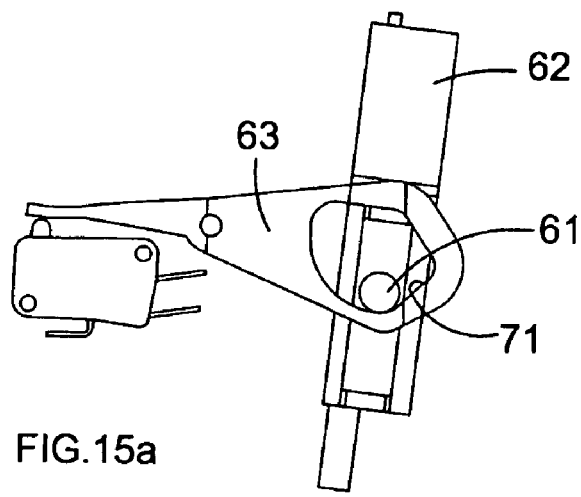
FIG. 15a is a side view of the switching mechanism of FIG. 14A in which the handle assembly is rotated through 90☐ relative to the housing and the switch and relay are in the open position.

Referring to FIG. 8, the hedge trimmer body housing (3) can be pivoted at 90° relative to the handle assembly (2). Referring now to FIG. 15*a*, the pin housing (62) is rotated through 90° from the position shown in FIG. 14*a*. Pin (61) now abuts third cam surface (71), and as the hedge trimmer housing has remained stationary, arm member (63) remains in the same position.

Figure 15B:
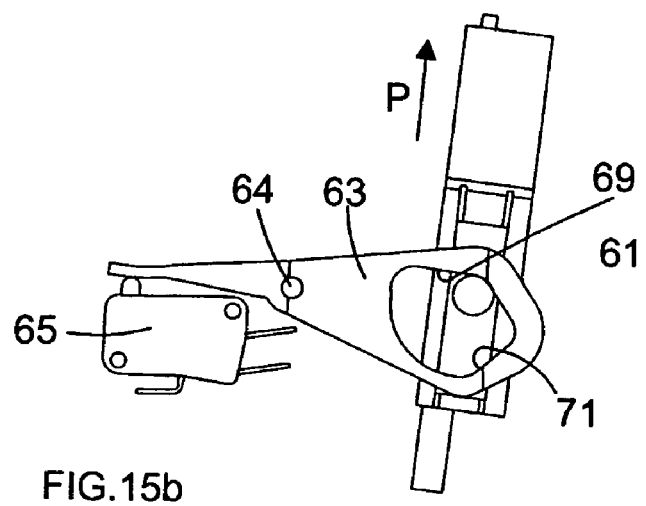
FIG. 15b is a side view of the switching mechanism of FIG. 15A in the partially closed position.

Referring now to FIG. 15*b*, when a user depresses a first switch (not shown), in the same way as shown in FIG. 14*b* except at 90° to FIG. 14*b*, pin (61) moves through a first distance in the direction of arrow P from cam surface (71) to cam surface (69). It can be seen however, that pin (61) has not moved sufficiently to pivot arm (63) about pin (64) to close relay (65).

Figure 15C:
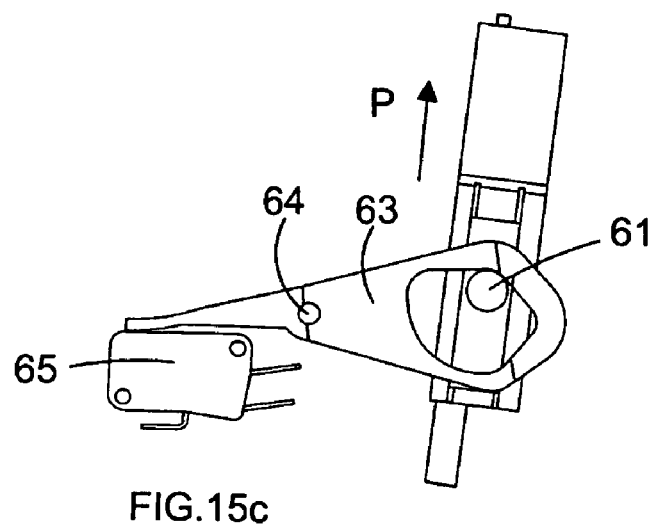
FIG. 15c is a side view of the switching mechanism of FIG. 15A in which the relay is closed.

Referring now to FIG. 15*c*, in order to close relay (65), the user must depress a second switch (not shown) which further moves pin (61) in the direction of arrow P thus pivoting arm (63) about pin (64) and completing the closure of relay (65).

Figure 11:
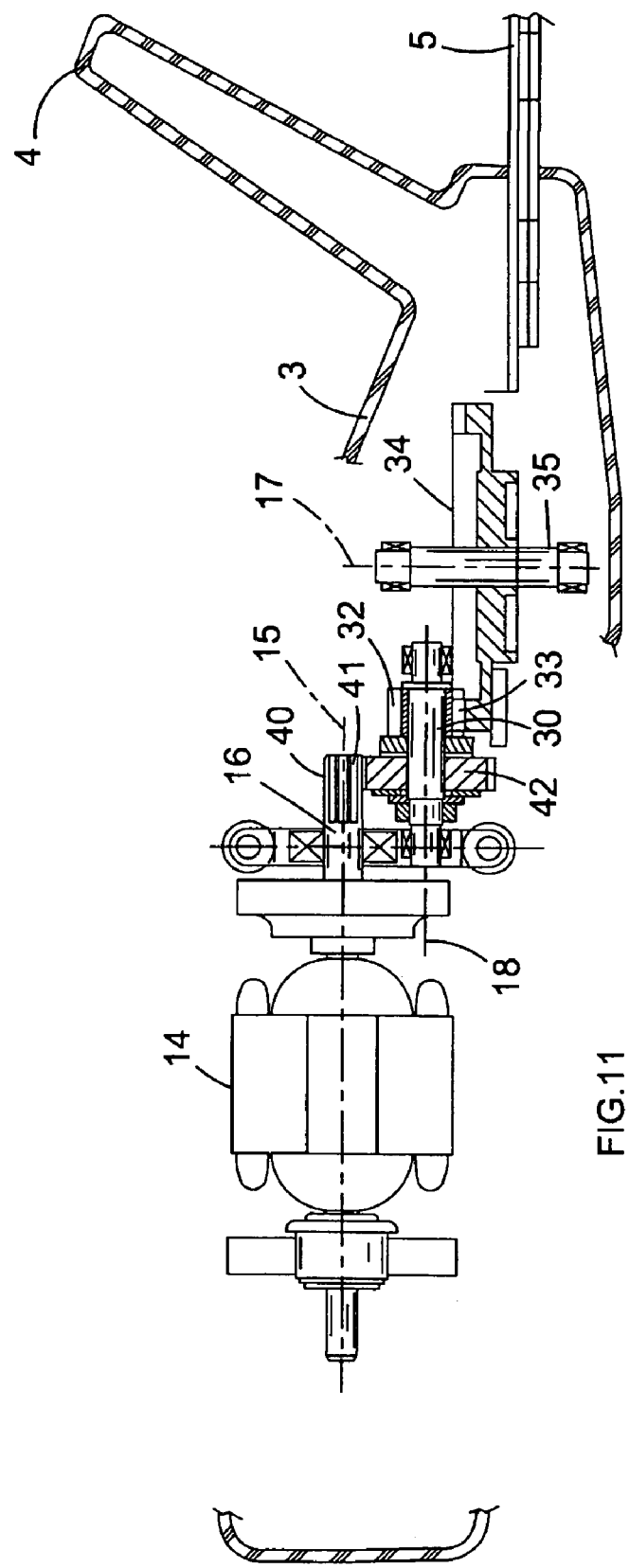
FIG. 11 is a side cross sectional view of the housing of a hedge trimmer incorporating the gear conversion mechanism of FIGS. 10a and 10b.

Referring now to FIG. 11, an electric motor (14) is disposed axially in housing (3), such that the axis of rotation (15) of the motor output shaft (16) is parallel to the plane of blade (5). It can be seen therefore that in order to drive the blade mechanism, the direction of rotation about axis (15) needs to be converted through 90° into rotation about axis (17).

Figure 10A:
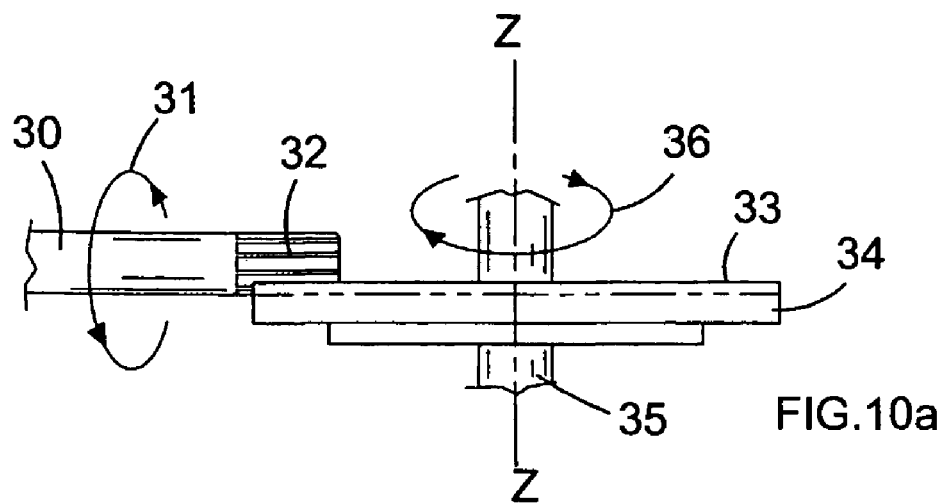
FIG. 10a is a cross sectional side view of the gear conversion mechanism of the present invention.
Figure 10B:
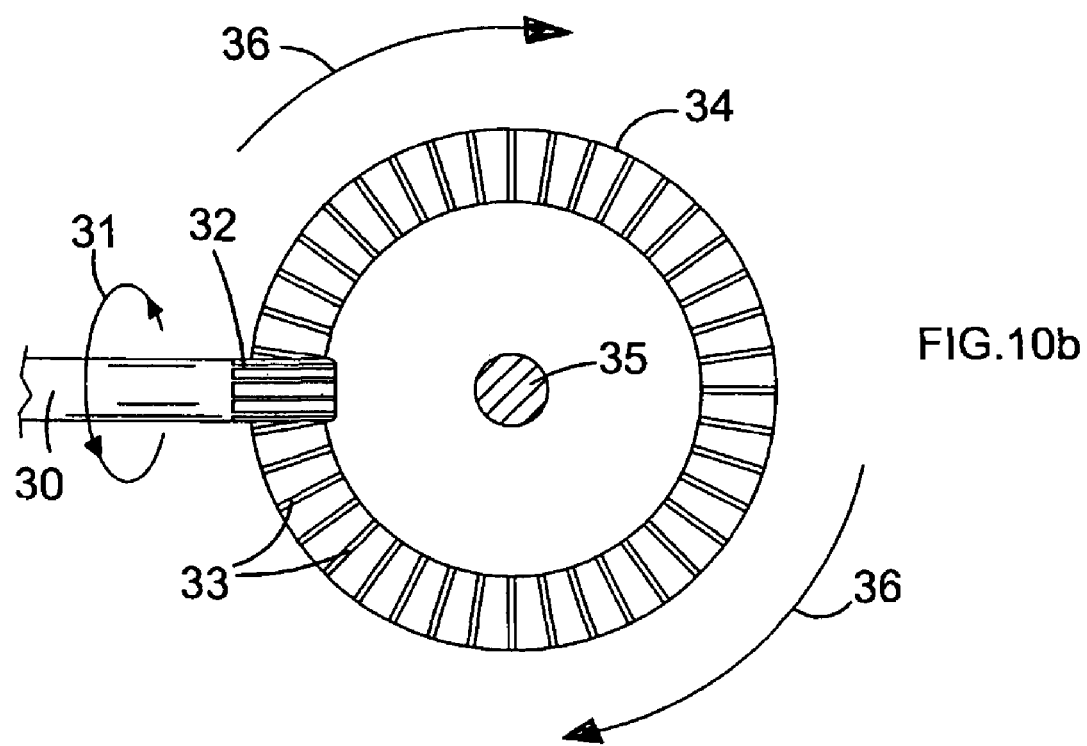

As shown in FIGS. 10*a* and 10*b*, the drive conversion mechanism of the present invention for converting rotation about a first axis to rotation about a second axis comprises a shaft (30) rotating in the direction of arrow (31). A plurality of axially aligned parallel teeth (32) are formed at the end of shaft (30). Parallel teeth (32) intermesh with a second plurality of radial teeth (33) formed on the upper surface of a gear plate (34). Gear plate (34) is mounted on a second shaft (35) such that gear plate (34) is free to rotate about an axis Z-Z. As a result of this, the rotation of shaft (30) imparts rotation to gear plate (35) in the direction of arrow (36) due to the reaction between teeth (32) and teeth (33).

This method of converting rotation about a first axis into rotation about a second axis generally perpendicular to said first axis is substantially less expensive to manufacture than prior art methods, as the engineering tolerances between teeth (32) and shaft (30) and teeth (33) on the gear plate (34) can be less than those needed to be achieved with the conical gears of the prior art drive mechanisms.

Referring again to FIG. 11, the incorporation of the drive conversion mechanism of FIGS. 10*a* and 10*b* into the hedge trimmer of the present invention will now be described.

An electric motor drives a rotary output shaft (16) adapted to rotate about axis (15). A plurality of teeth (40) are formed on the edge of shaft (16) and intermesh with a second plurality of teeth (41) formed on a gear (42). Gear (42) is adapted to rotate about axis (18) which is parallel to axis (15), and as gear (42) comprises a larger number of teeth (41) than the number of teeth (40) formed on output shaft (16), the rotational speed of gear (42) is less than that of output shaft (16). Gear (42) is mounted on a shaft (30) which has a further set of teeth (32) formed around the edge of shaft (30). Teeth (32) intermesh with a plurality of radial teeth (33) formed on the upper surface of a gear plate (34). Gear plate (34) is mounted on shaft (35) and adapted to rotate about axis (17) such that the rotation of shaft (30) about axis (18) is converted to rotation about axis (17) generally perpendicular to axis (18).

It can therefore be seen that the teeth on shaft (32) can still drive gear plate (34) despite variations in position between the shaft and the gear plate, provided the teeth on the shaft still engage the teeth on the gear plate. The shaft and gear plate therefore do not need to be as accurately located relative to each other as the bevel gears of the prior art.

It can also be seen that the inline rotation of the motor output shaft (16) is converted into rotation in the plane of blade (5). The blade (5) is connected to gear plate (34) via a drive conversion mechanism for converting rotary motion about axis (17) into linear reciprocating motion perpendicular to axis (17) in a manner which will be familiar to persons skilled in the art, such as a scotch yoke mechanism. Mechanisms of this type are well known in the art and will not be described herein in any further detail.

Referring to FIGS. 18 to 24, in which parts common to the embodiments of FIGS. 14 to 17 are denoted by like reference numerals but increased by 100, a hedge trimmer housing 103 of a third embodiment of the invention has a first clam shell half 200 and second clam shell half 202, the clam shell halves 200, 202 defining respective apertures 204, 206 for pivotably receiving a handle assembly 208 (FIG. 19) of the hedge trimmer. The first clam shell half 200 receives a lever 210, one end of which carries a first retaining member 181, the retaining member 181 being urged outwardly of the housing by a short, strong compression spring 186 arranged between the clam shell half 200 and the lever 210. By using a short compression spring 186, a stronger spring can be used than in the embodiment of FIGS. 16 and 17. A second retaining member 182 and lever 189 are attached to the clam shell half 200 via pivot pin 188, and an end of the lever 189 is located in a recess on the lever 210 such that longitudinal movement of lever 210 (and therefore first retaining member 181) causes pivotal movement of second retaining member 182 relative to the housing 103.

The lever 210 is connected to a release button 212 (FIG. 22) slidably mounted to the outside of the clam shell half 200, such that depression of the release button 212 causes longitudinal movement of lever 210 against the action of compression spring 186, in a manner similar to the embodiment of FIGS. 16 and 17. The lever 210 carries an interlock member 214, the purpose of which will be described in greater detail below.

Figure 18:
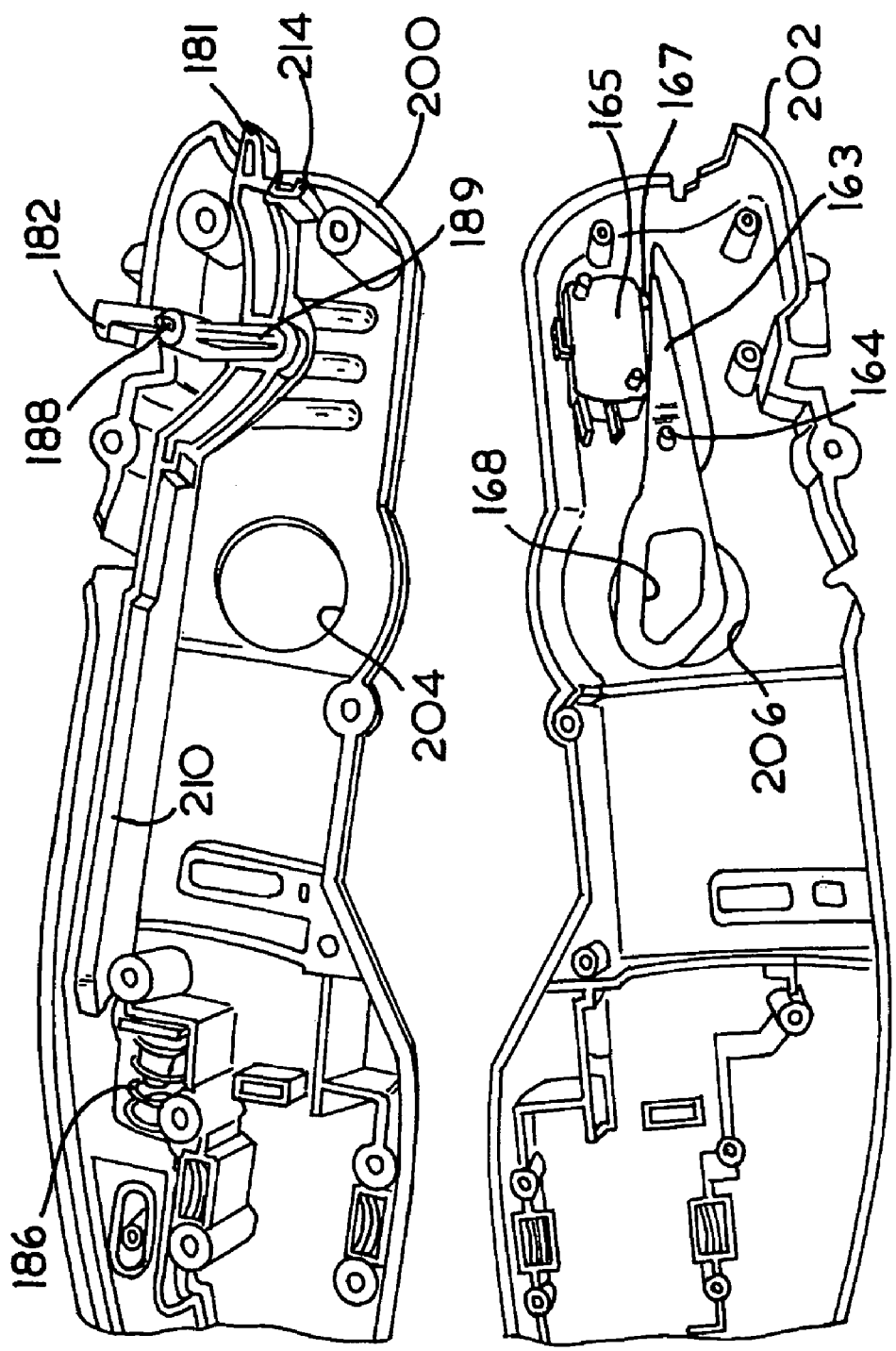
FIG. 18 is a view of the housing of a hedge trimmer of a third embodiment of the present invention, with the clamshell halves of the housing separated.
Figure 19:
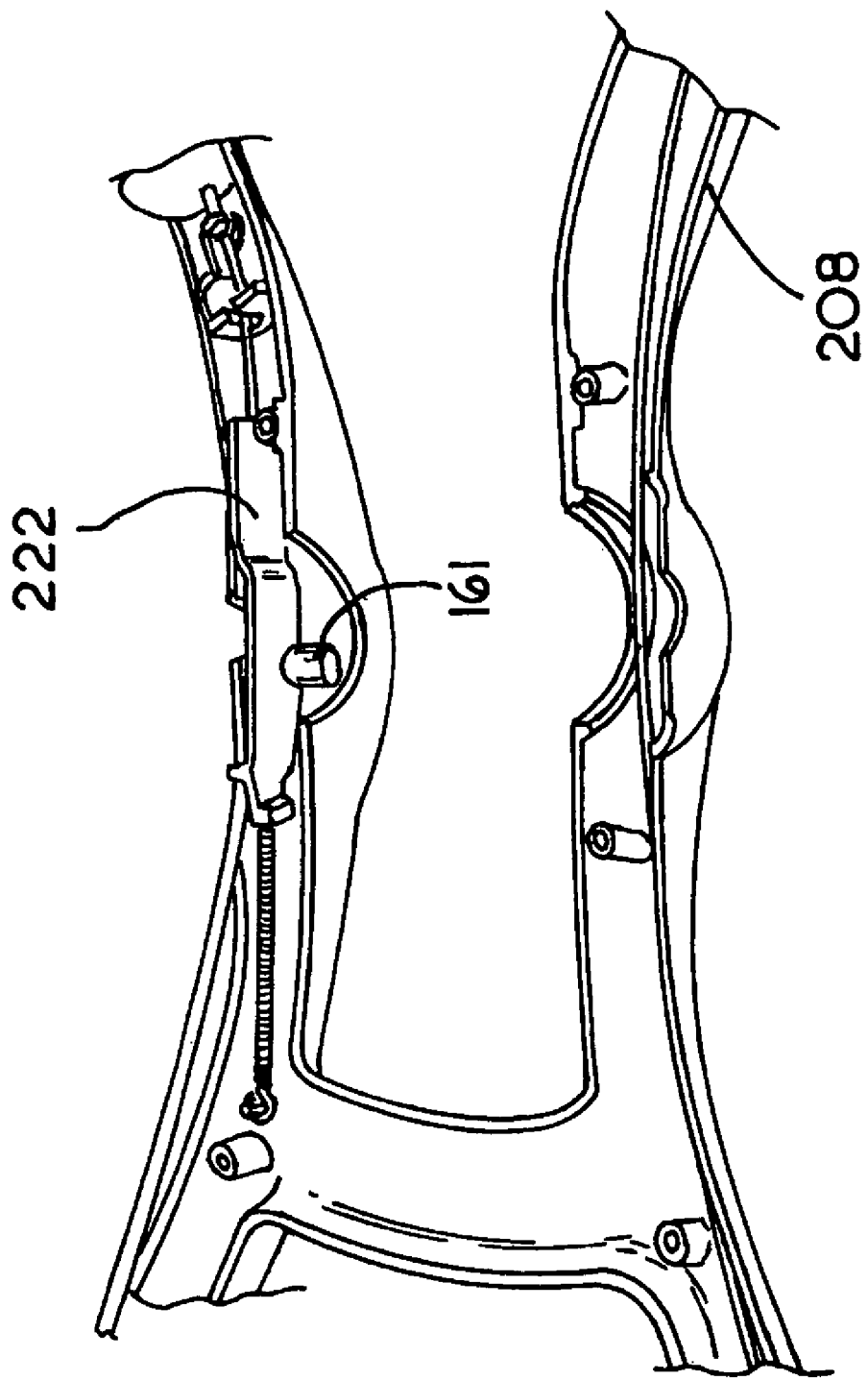
FIG. 19 is a perspective view of part of the handle assembly of the hedge trimmer of FIG. 18.
Figure 20:
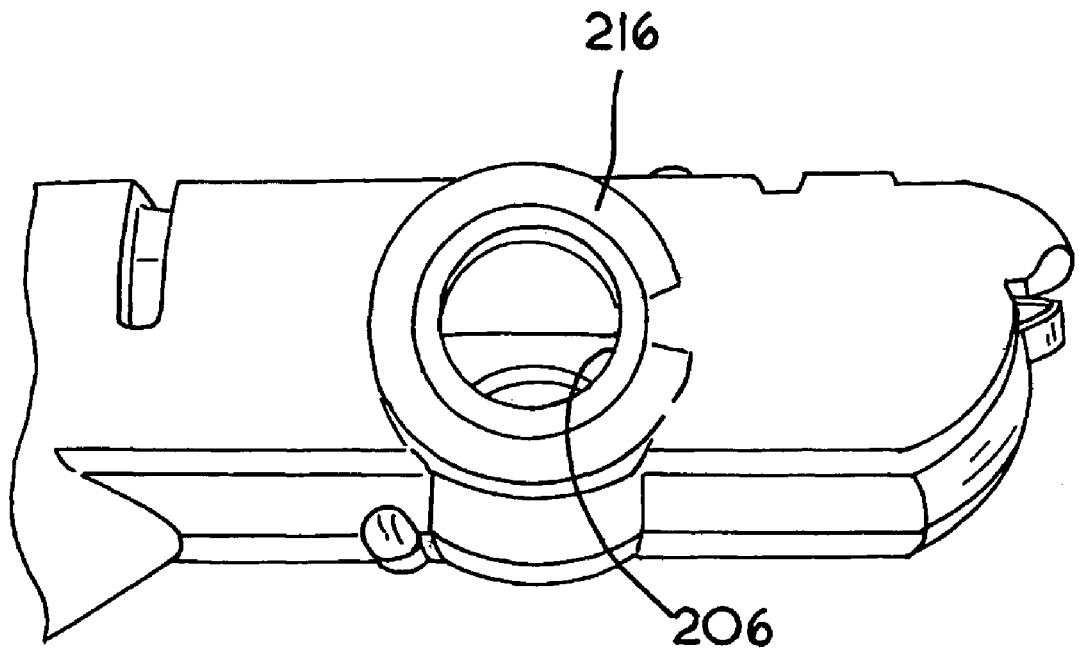
FIG. 20 is a view of the exterior of a rear part of the housing of the hedge trimmer of FIG. 18.
Figure 22:
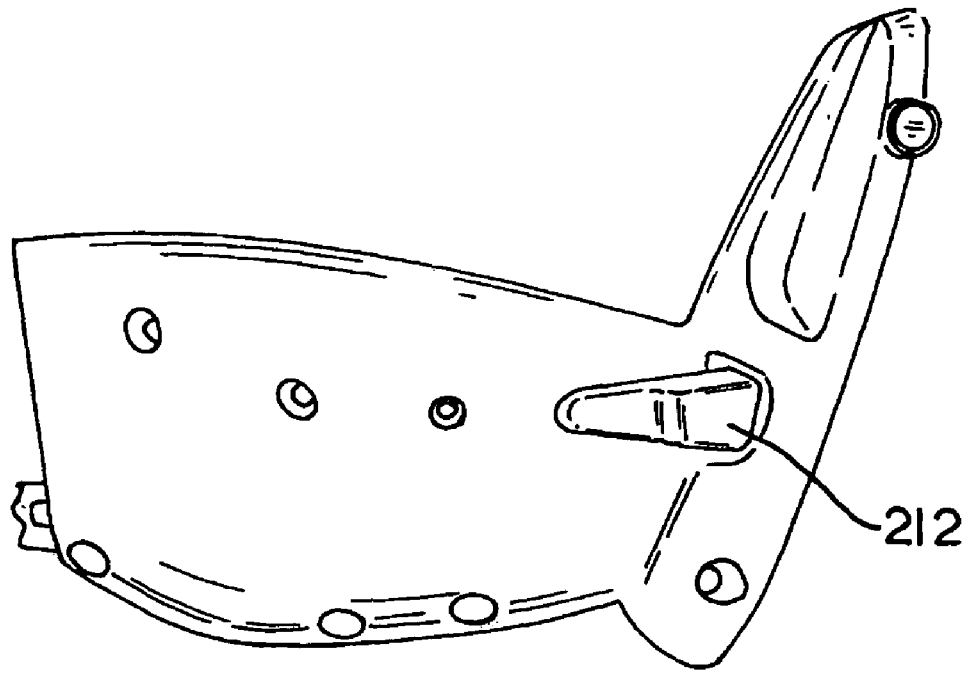
FIG. 22 is an external view of the part of the housing of FIG. 21.

The second clam shell half 202, which mates with first clam shell half 200 to form the housing 103, accommodates an electrical relay 165 for actuating the motor (not shown) of the hedge trimmer. The relay 165 has a first switch member 167 which actuates the hedge trimmer motor by being pressed inwardly of electrical relay 165 by pivotal movement of arm member 163 relative to clam shell half 202 about pin 164. The relay 165 also carries a second switch member (not shown) located behind the first switch member 167 as shown in FIG. 18 and adapted to be disabled by being urged inwardly of the relay 165 by arm member 163, and is actuated by being released from the relay 165 by approximately half the distance first switch member 167 needs to protrude from the relay 165 to disable the motor. Actuation of the second switch short circuits the motor to cause a braking action which brings the hedge trimmer blade to a halt more quickly, thus improving the safety of the hedge trimmer. The arm member 163 has an aperture 168 which is engaged by a pin 161 on a support 222 slidably mounted to handle assembly 208 (FIG. 19). A radially protruding segment 216, the function of which will be described in greater detail below, is provided adjacent aperture 206 on clam shell half 202.

Figure 23:
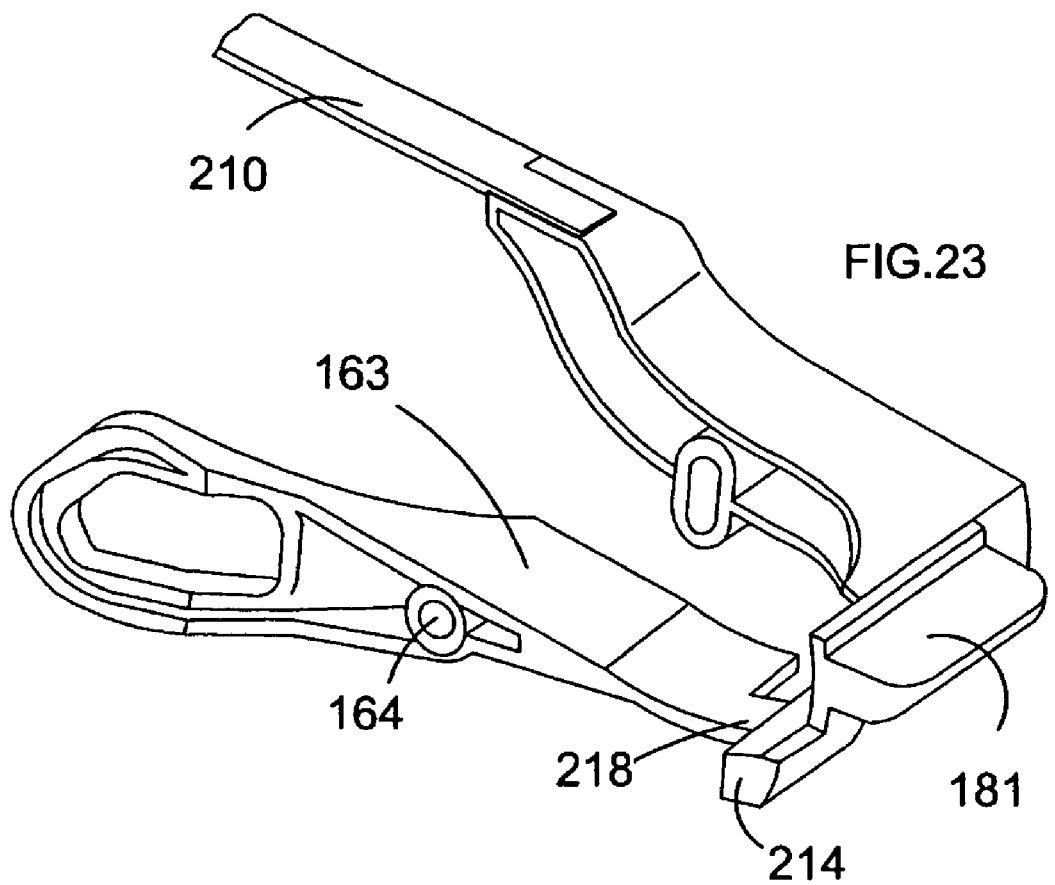
FIG. 23 is a schematic perspective view of an actuator member and interlock member of the hedge trimmer of FIG. 18 in a first condition in which the motor of the hedge trimmer is actuated.
Figure 24:
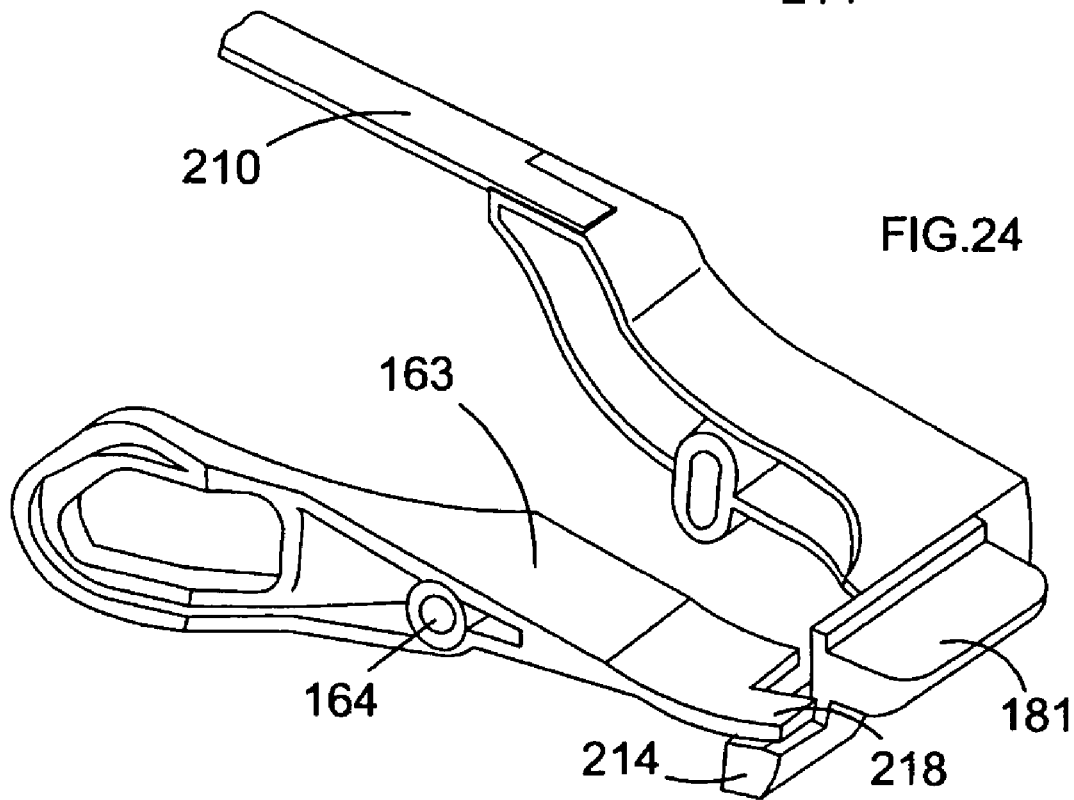
FIG. 24 is a schematic view, corresponding to FIG. 23, of the actuator member and interlock member of FIG. 23 in a second condition in which the motor is prevented from being actuated.

Referring now to FIGS. 23 and 24, when the arm member 163 is pivoted downwards about pin 164 to press first switch member 167 inwardly of relay 165 to actuate the motor, axial movement of the lever 210 so as to retract first retaining member 181 into the housing 103 to enable pivoting of the housing 103 relative to the handle assembly 208 brings interlock member 214 into abutment with an end 218 of arm member 163. This prevents further axial movement of lever 210 so that the first 181 and second 182 retaining members cannot be retracted into the housing. As a result, when the hedge trimmer motor is actuated, it is not possible to release the handle assembly 208 from the housing 103 to allow pivotal movement of the handle assembly relative to the housing.

As shown in FIG. 24, when the lever 210 is moved axially sufficiently to retract first retaining member 181 and second retaining member 182 into the housing 103 sufficiently to allow pivotal movement of the handle assembly 204 relative to the housing 103, the end 218 of arm member 163 is located on top of interlock member 214, which prevents the arm member 163 being pivoted downwardly about pin 164 to actuate the hedge trimmer motor. Accordingly, when the latch mechanism is released from the handle assembly, the hedge trimmer motor cannot be actuated. As a further safety feature, when the handle assembly 208 is located in an orientation relative to the housing 103 between the end positions in which the first 181 or second 182 retaining member engages cooperating parts of the handle assembly 208, the radially projecting segment 216 (FIG. 20) around aperture 206 prevents longitudinal movement of the support 220 (FIG. 19) carrying pin 161 relative to the handle assembly 208. This in turn prevents movement of the pin 161 relative to aperture 168 in arm member 163, which therefore prevents pivoting of arm member 163 about pin 164 when the housing 103 is not latched to the handle assembly 208 in one of its two working positions relative to the handle assembly 208, as a result of which the hedge trimmer motor cannot be actuated.

The operation of the embodiment shown in FIGS. 18 to 24 will now be described.

When the housing 103 is located relative to the handle assembly 208 such that the housing 103 is in one of the two working orientations relative to the handle assembly 208, the handle assembly 208 is engaged by the first 181 or second 182 retaining member, as a result of which the retaining members 181, 182 protrude from the housing 103 and the arm member 163 can freely pivot about pin 164 to actuate the motor. When the motor is actuated, the end 218 of the arm member 163 becomes located behind interlock member 214 to prevent retraction of the retaining members 181, 182 into the housing 103, as a result of which the housing 103 cannot be released from the handle assembly 208 or pivoted relative to the handle assembly 208.

When the ON/OFF switches (not shown) on handle assembly 208 are released, the arm member 163 pivots away from relay 165 to enable the first 167 and second switch members to protrude outwardly of the relay 165 to de-energise the motor and apply a braking action by short circuiting the motor. At the same time, the end 218 of arm member 163 is now located above interlock member 214, as a result of which it can slide over the end 218 of arm member 163 to enable the retaining members 181, 182 to be retracted into the housing 103 by depressing release button 212. Once the interlock member 214 becomes located behind end 218 of arm member 163, the arm member 163 can no longer be pivoted towards the relay 165 to actuate the motor. As the handle assembly 208 is pivoted relative to the housing 103, the retaining members 181, 182 may again protrude from the housing 103 to enable arm member 163 to pivot into contact with the relay 165. However, pivotal movement of the arm member 164 is prevented because radially projecting segment 216 comes into engagement with pin support 222 to prevent axial movement of pin 161 relative to the handle assembly 208, as a result of which the pin 161 cannot cause pivotal movement of arm member 163.

Figure 25:
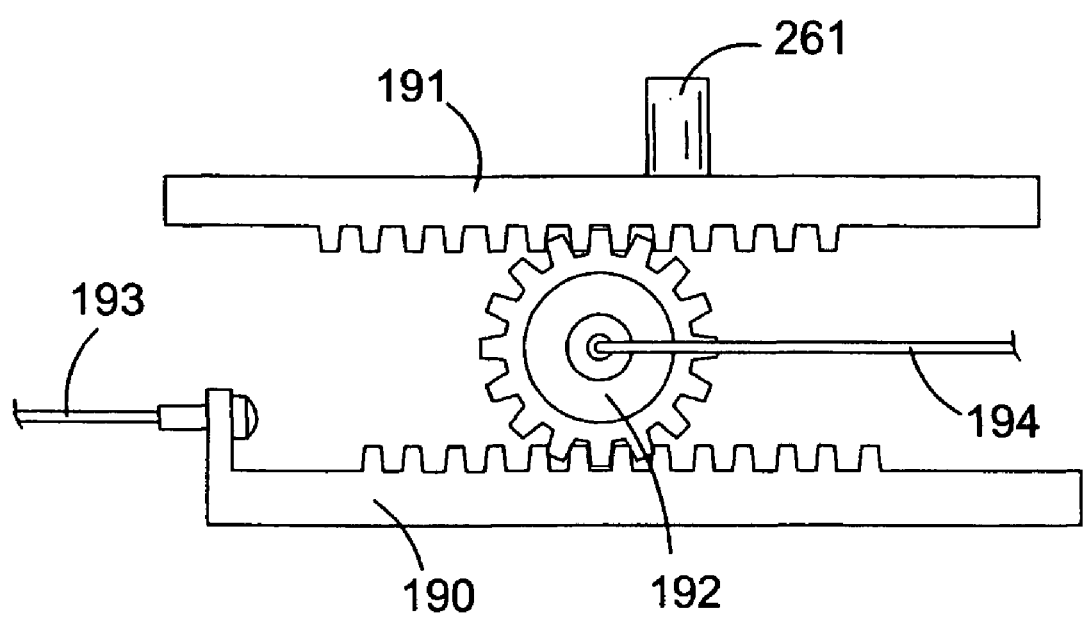
FIG. 25 shows a rack and pinion arrangement for use in an alternative embodiment to that shown in FIG. 19.

Referring now to FIG. 25, an alternative arrangement to that shown in FIG. 19 is illustrated, and parts common to the embodiment of FIG. 19 are denoted by like reference numerals but increased by 100. A pair of rack members (190), (191) engage a pinion (192). The rack member (190) is connected via wire (193) to a switch on rear handle (107), while the pinion (192) is connected via wire (194) to front handle (106), the pin (261) being mounted on rack member (191).

When the front (106) or rear (107) handle is actuated, the rack member (191) is displaced relative to the hedge trimmer housing (103), but is displaced an insufficient distance to cause pin (261) to actuate the hedge trimmer motor. However, sufficient displacement of the pin (261) to actuate the motor occurs if the front (106) and rear (107) handles are actuated simultaneously.

Figure 26:
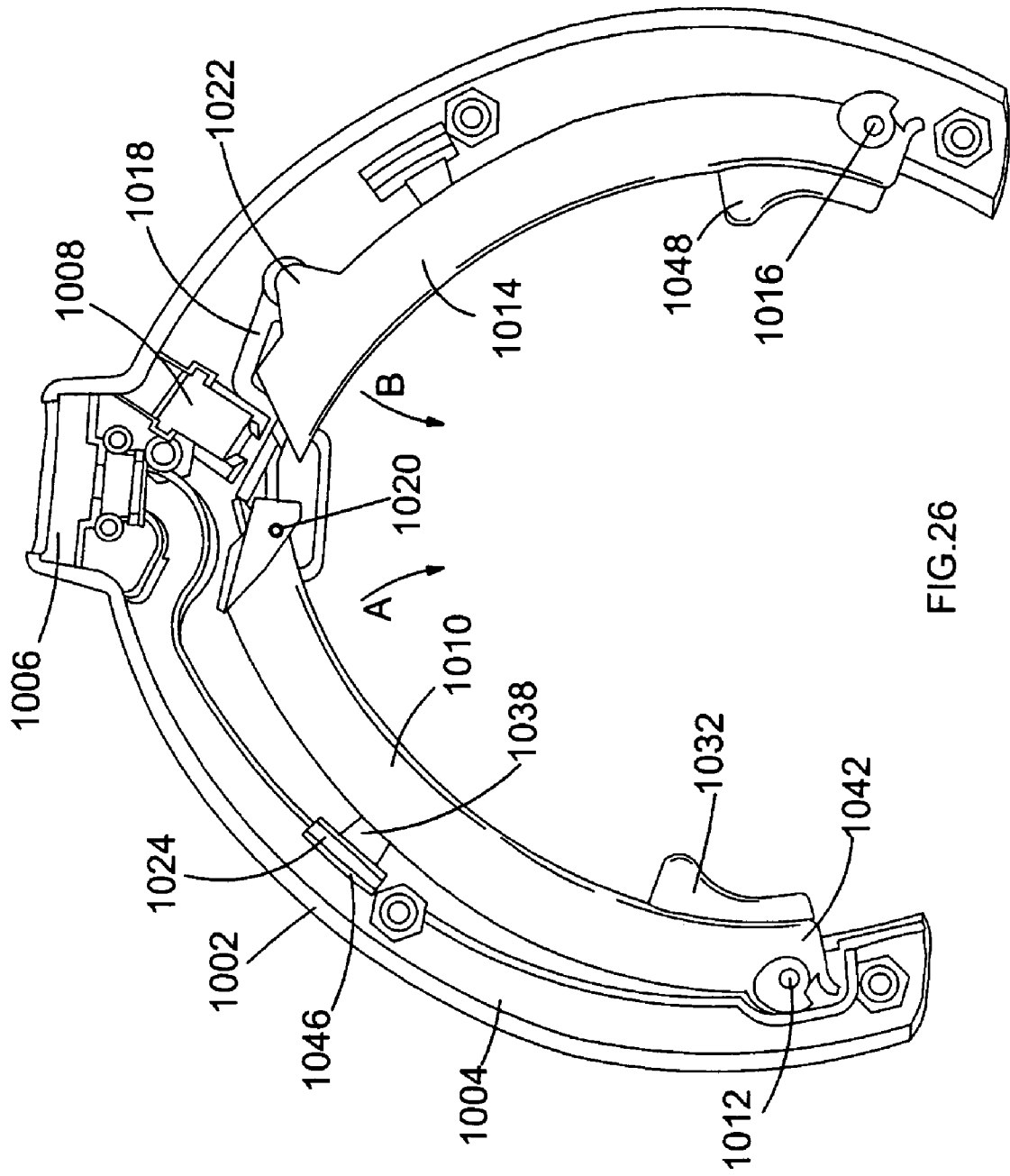
FIG. 26 is a partially cut away plan view of a rear handle assembly of a further embodiment of the present invention with both rear actuators in an OFF position.
Figure 27:
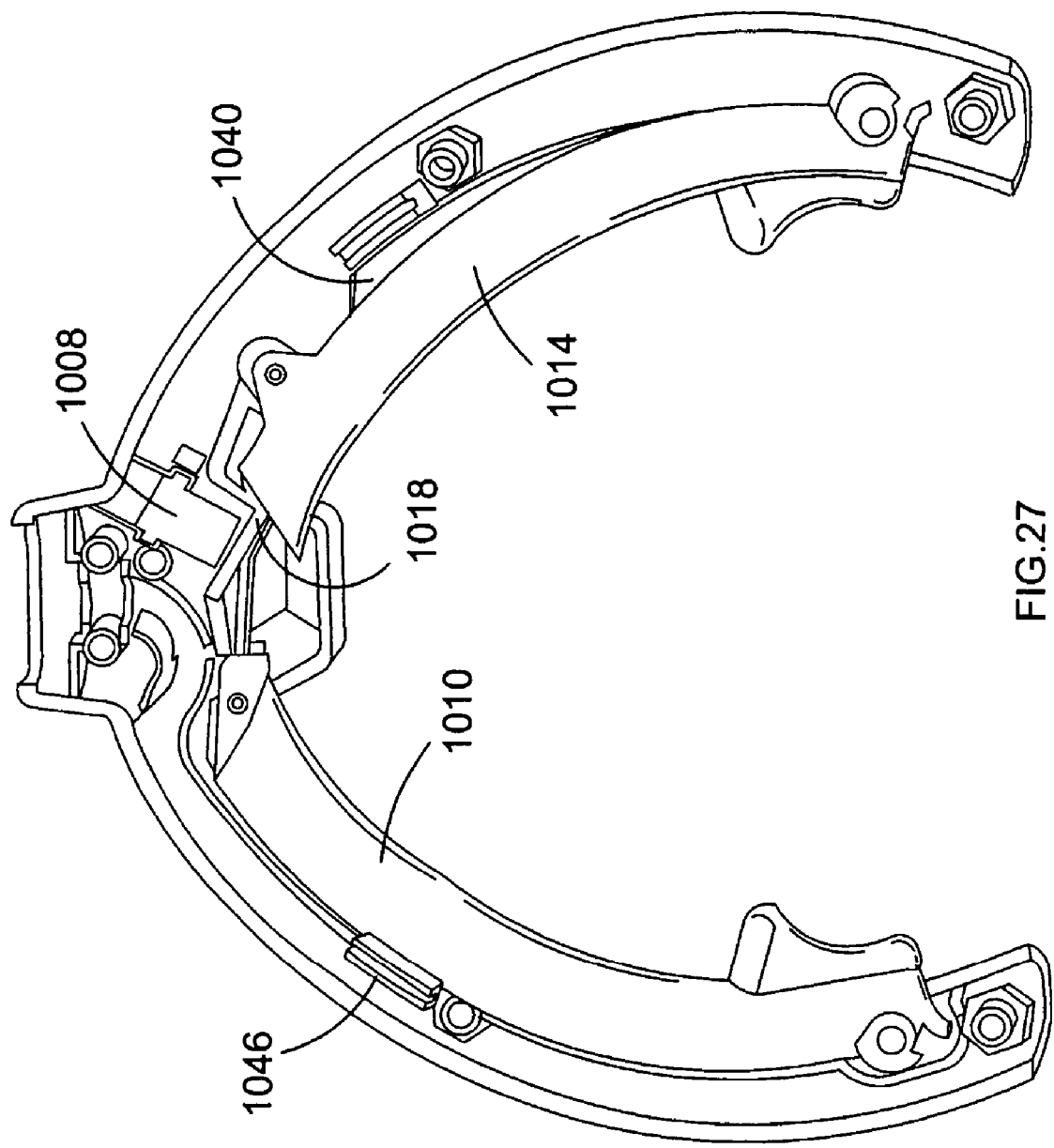
FIG. 27 is a view corresponding to FIG. 26 with one of the actuators in an ON position.
Figure 28:
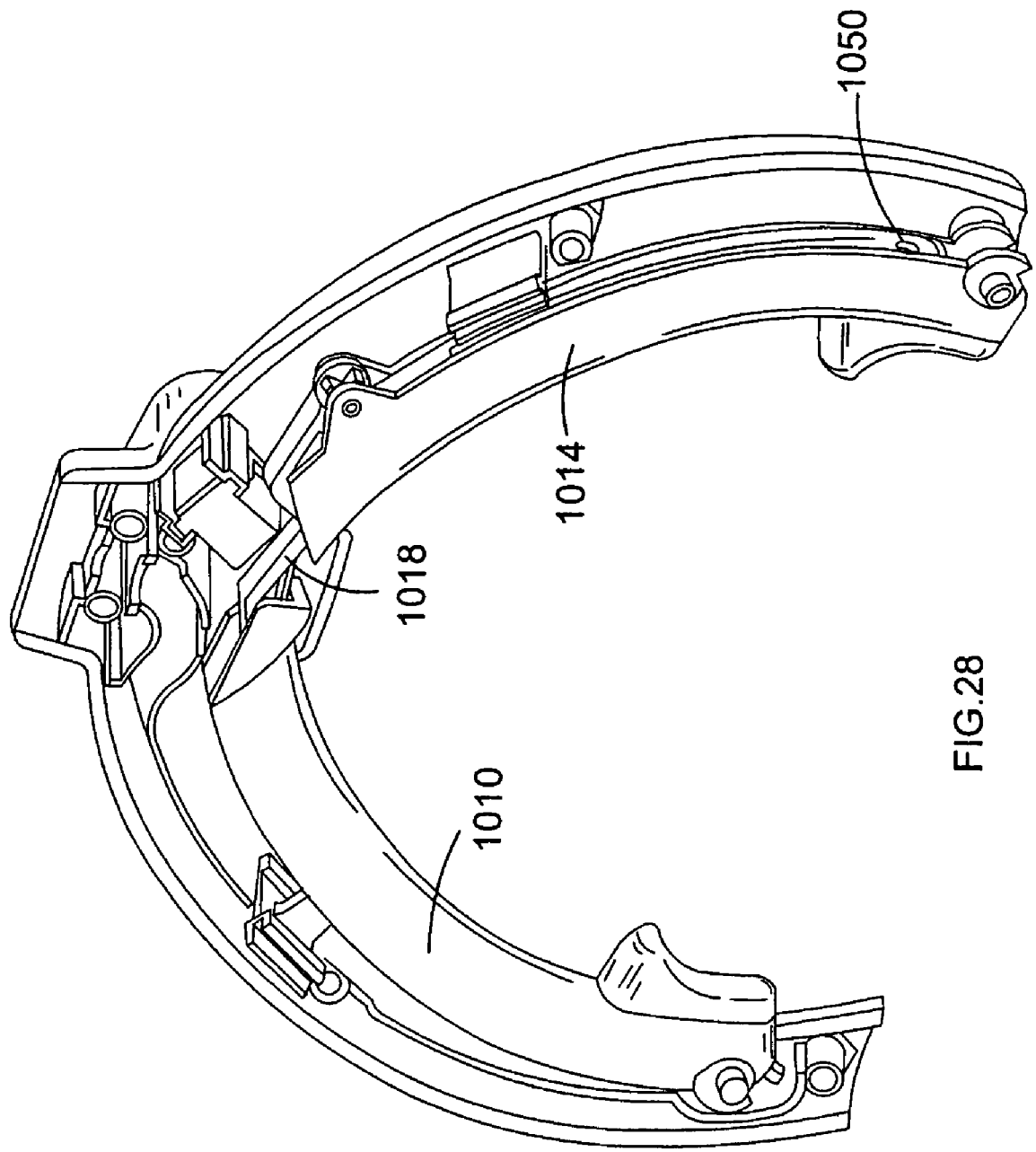
FIG. 28 is a perspective view corresponding to FIG. 26.
Figure 29:
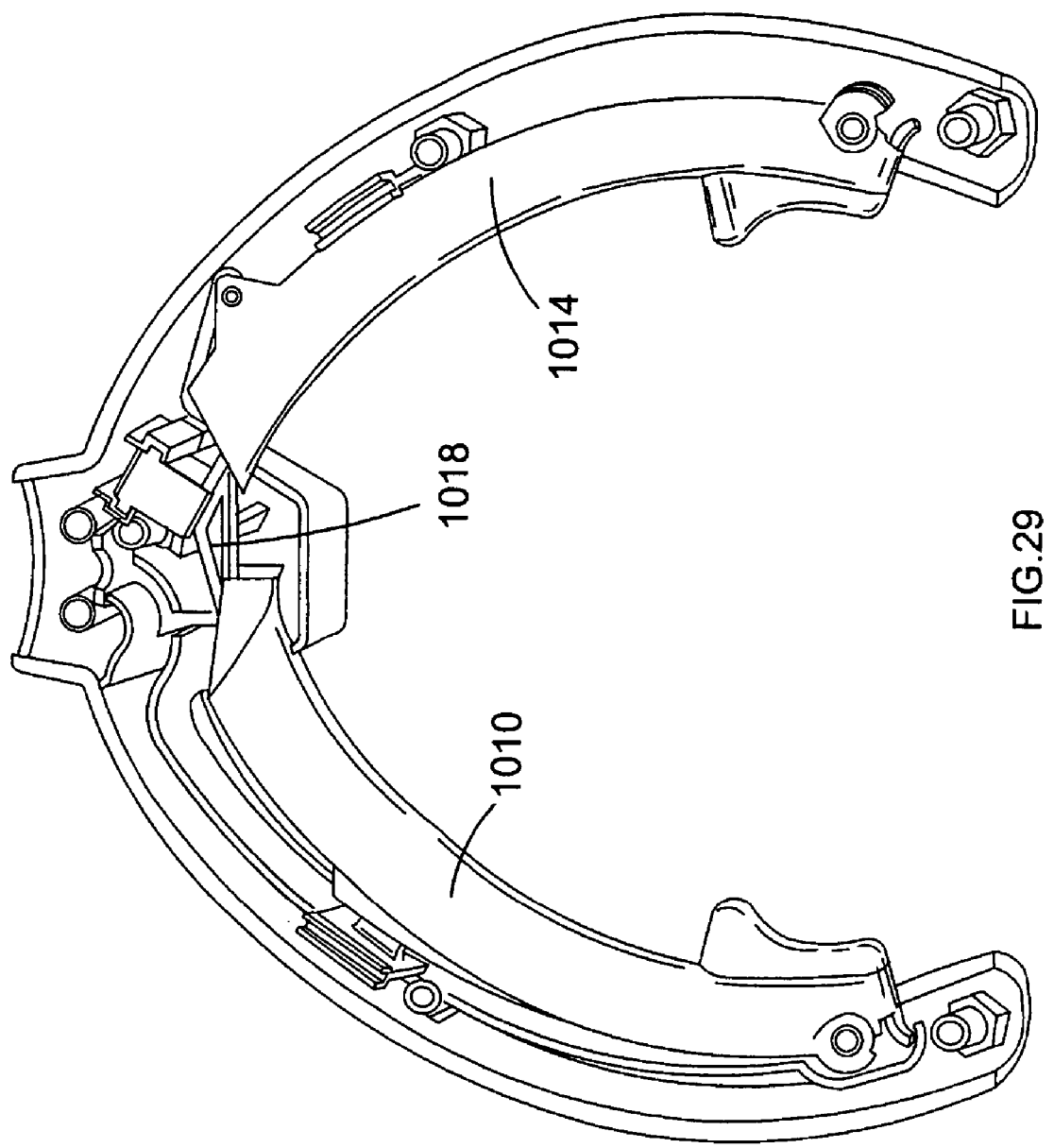
FIG. 29 is a view corresponding to FIG. 27 but with the other actuator member in an ON position thereof.
Figure 30:
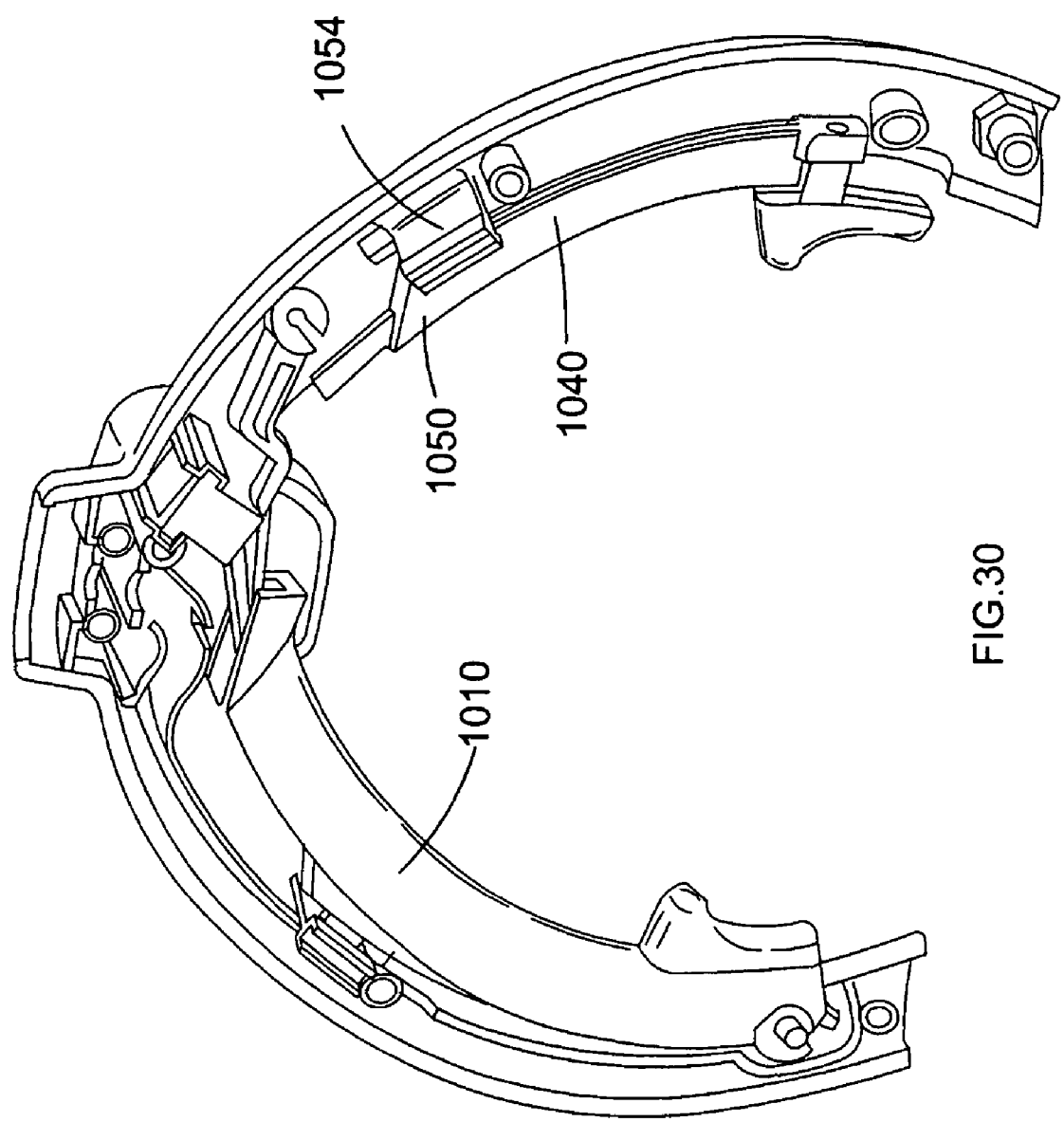
FIG. 30 is a view corresponding to FIG. 29 with one of the actuator members removed.
Figure 31:
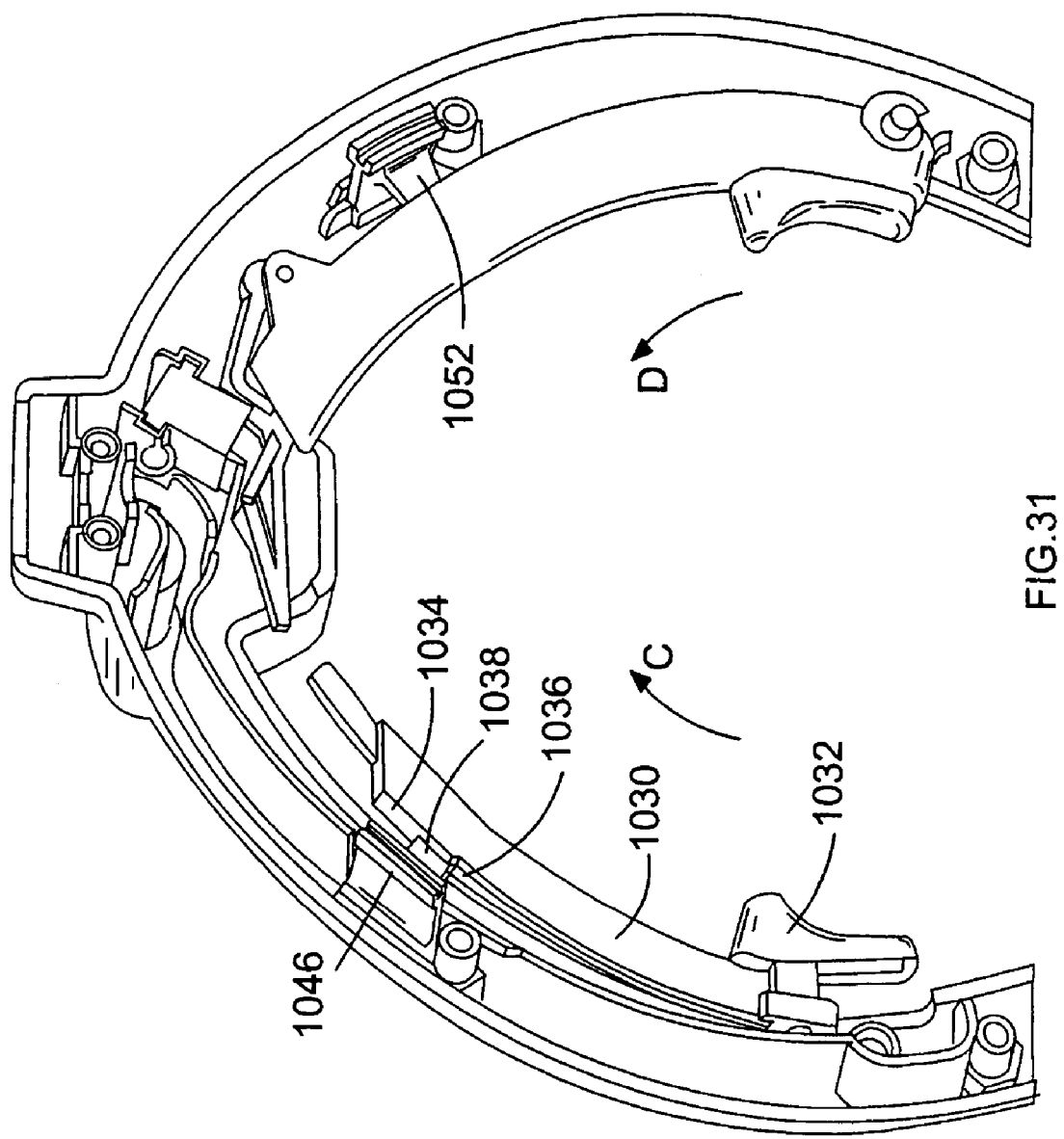
FIG. 31 is a view corresponding to FIG. 30 with the other actuator member removed.
Figure 32:
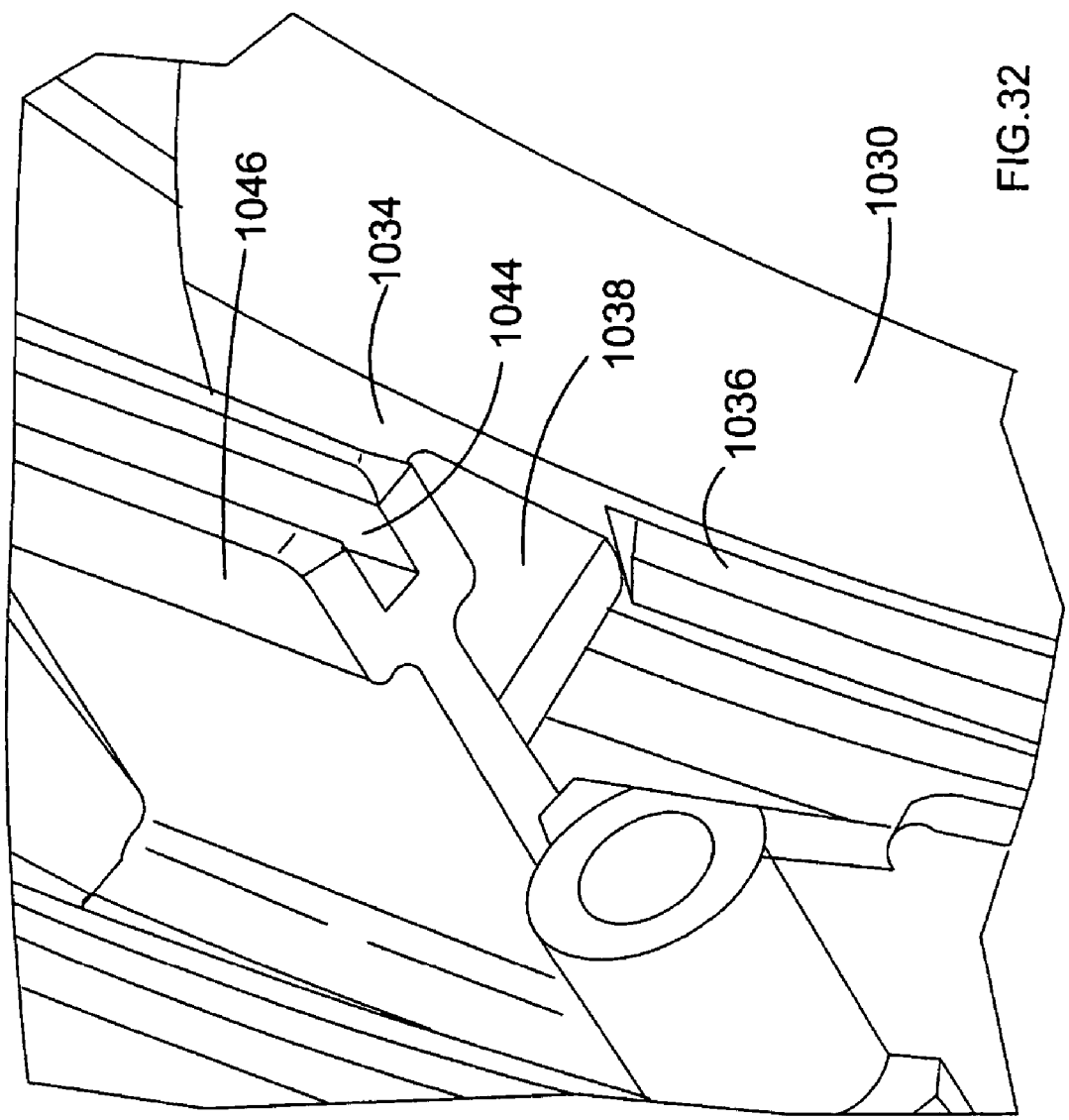
FIG. 32 is a detailed view of part of a locking member of the arrangement of FIGS. 26 to 31.

A handle assembly of a hedge trimmer of a further embodiment of the invention is shown in FIGS. 26 to 32. Referring firstly to FIGS. 26 and 31, a rear handle 1002 of the hedge trimmer has a hollow handle housing 1004 having an inlet 1006 for a power cable (not shown) and an electrical switch assembly 1008 for actuating a motor (not shown) of the hedge trimmer. The electrical switch assembly 1008 is actuated by means of a first actuator lever 1010 pivotally mounted to the handle housing 1004 by means of a pivot 1012, or a second actuator member 1014 mounted to the housing by means of a pivot 1016, by means of the user gripping one of the actuator levers 1010, 1014.

A lever 1018 is pivotally attached to actuator members 1010, 1014 at pivots 1020, 1022 respectively such that pivotal movement of actuator member 1010 or 1014 urges lever 1018 into contact with electrical switch assembly 1008 to actuate the hedge trimmer motor (not shown), but the lever 1018 prevents simultaneous pivotal movement of both actuator members 1010, 1014 relative to the housing 1004. The actuator levers 1010, 1014 are urged in the direction of arrows A and B respectively (FIG. 26) relative to the housing 1004 by respective torsion springs (not shown) mounted around pivot axes 1012, 1016 respectively.

Referring now to FIG. 31, which corresponds to FIG. 26 but with the left hand actuator lever 1010 removed, a locking member 1030 having a thumb catch 1032 is slidably mounted to the actuator lever 1010. The locking member 1030 is provided with a solid portion 1034 and a slot 1036 such that when the locking member 1030 is in the position shown in FIG. 31, a projection 1038 (FIG. 26) abuts solid portion 1034 of locking member 1030 to prevent pivoting of the corresponding actuator lever 1010 about pivot 1012, which in turn prevents actuation of the electrical switch assembly 1008. However, as the locking member 1030 is moved in the direction of arrow C shown in FIG. 31, the slot 1036 of locking member 1030 is brought alongside projection 1038 to allow pivoting of the locking member 1030 and corresponding actuator member 1010 about pivot 1012. The actuator lever 1014 is provided with a similar locking member 1040 (FIG. 27) which operates in a similar manner to the locking member 1030, but is also provided with a tensioning spring (not shown) acting between the locking member 1040 and the actuator lever 1014. The tension spring urges the locking member 1040 in a direction opposite to arrow D in FIG. 31.

A tension cable (not shown) passes around a lower end 1042 of actuator lever 1010 and is secured to thumb catch 1032, and passes through a slot 1044 in member 1046 having protrusion 1038 extending therefrom, and the other end of tension cable (not shown) is secured to thumb catch 1048 on locking member 1040 and passes upwardly through a hole 1050 (FIG. 28) in locking member 1040. In this way, movement of thumb catch 1032 in the direction of arrow C in FIG. 31 causes the tension cable to move thumb catch 1048 in the direction of arrow D in FIG. 31.

The operation of the hedge trimmer incorporating the handle assembly shown in FIGS. 26 to 31 will now be described.

The thumb catches 1032, 1048, together with the corresponding locking members 1030, 1040 are initially biased by the tensioning spring downwardly relative to the corresponding actuator levers 1010, 1014 (i.e. opposite to the direction of arrows C and D in FIG. 31), as a result of which pivoting of the actuator levers 1010 and 1014 relative to the housing 1004 is prevented by abutment of the solid portion 1034 of actuator member 1030 and a corresponding solid portion 1050 on locking member 1040 (FIG. 30) against corresponding projections 1038, 1052 (FIG. 31) on members 1046, 1054 respectively. As a result, neither actuator lever 1010 nor 1014 can urge lever 1018 into engagement with electrical switch assembly 1008, as a result of which the hedge trimmer motor cannot be actuated. This prevents inadvertent one-handed actuation of the hedge trimmer.

In order to actuate the hedge trimmer, the user holds one of the actuator levers 1010, 1014 (depending upon whether the user is left or right handed), and displaces the corresponding thumb catch 1032 or 1048 in the direction of arrow C or D shown in FIG. 31. As a result, the tension cable causes movement of the other thumb catch towards its release position, as a result of which both locking members 1030, 1040 are moved such that the corresponding solid portions 1034, 1050 are moved out of engagement with the corresponding protrusions 1038, 1052 on members 1046, 1054 to allow pivotable movement of the actuator levers 1010, 1014 relative to the handle. Movement of one of the actuator levers 1010, 1014 relative to the handle brings the lever 1018 into engagement with the electrical switch assembly 1008 to actuate the motor of the hedge trimmer.

When the actuator levers 1010, 1014 are released, the torsion springs (not shown) urge the actuator levers 1010, 1014 and locking members 1030, 1040 outwardly relative to the handle housing 1004, as a result of which the locking members 1030, 1040 are urged by means of the tensioning spring and tension cable (not shown) opposite to the direction of arrows C and D in FIG. 31 to prevent further actuation of actuator levers 1010, 1014 until the thumb catches 1032, 1048 have again been slid out of their locking position.

It will be appreciated by persons skilled in the art that the above embodiments have been described by way of example only and not in any limitative sense, and that various alterations and modifications are possible without departure from the scope of the invention as defined by the appended claims.

The invention claimed is:

1. An actuator assembly for a power tool having a handle, a tool housing containing a motor, and a working member adapted to be actuated by means of the motor, the assembly comprising:

at least two actuator members located on the handle of the tool and adapted to be moved between a first position to actuate an electrical switch to actuate the motor, and a second position in which the electrical switch is not actuated;

a locking member mounted to each said actuator member, wherein said locking members are movable relative to the corresponding said actuator member between a respective first position in which actuation of said actuator member is permitted and a respective second position in which actuation of each said actuator member is prevented; and further including an interconnecting means for connecting said locking members.

2. An assembly according to claim 1, wherein at least one said locking member is adapted to abut at least one respective abutment on said handle when in the second position thereof to prevent movement of the corresponding said actuator member relative to the handle to its first position.

3. An assembly according to claim 1, wherein the at least one said locking member is slidable relative to the corresponding said actuator member between the respective first and second positions of said locking member.

4. An assembly according to claim 1, further comprising a first biasing means for urging at least one said locking member towards its second position.

5. An assembly according to claim 4, wherein said first biasing means comprises at least one spring.

6. An assembly according to claim 4, further comprising a second biasing means for urging at least one of said at least two actuator member towards a second position thereof.

7. An assembly according to claim 6, wherein said second biasing means comprises at a torsion spring.

8. An assembly according to claim 1, wherein the interconnecting means comprises a tension cable.

9. An assembly according to claim 1, further comprising a lever for preventing a first said actuator member from being in the first position when a second said actuator member is in the first position.

10. An assembly according to claim 9, wherein the lever is pivotally attached to adjacent end portions of said actuator members.

11. An actuator assembly for a power tool having a handle, a tool housing containing a motor, and a working member adapted to be actuated by means of the motor, the assembly comprising:

two actuator members located on the handle that can be moved independently relative to the handle of the tool between a first position to actuate an electrical switch to actuate the motor, and a second position in which the electrical switch is not actuated; and a lever located adjacent the two actuator members for contacting the electrical switch, the lever permitting only one actuator member to be in the first position.

12. An actuator assembly according to claim 11, further comprising a locking member for each actuator member, the locking members movable relative to the corresponding actuator members between a first position in which actuation of said actuator is permitted and a second position in which actuation of said actuator is prevented.

13. An actuator assembly according to claim 12, wherein each actuator member comprise a thumb catch connected to the locking member for slidably moving the locking member from its second to its first position.

14. An actuator assembly according to claim 13, wherein the thumb catches are connected by a tension cable so that movement of one thumb catch and its associated locking member moves the other thumb catch and it's associated locking member.

* * * * *